US012771138B2

(12) United States Patent
Cao et al.

(10) Patent No.: US 12,771,138 B2
(45) Date of Patent: Oct. 20, 2026

(54) INVERTER OF GRID-CONNECTED PHOTOVOLTAIC POWER GENERATION SYSTEM, STARTUP APPARATUS, METHOD, AND SYSTEM

(71) Applicant: Huawei Digital Power Technologies Co., Ltd., Shenzhen (CN)

(72) Inventors: Zhen Cao, Shanghai (CN); Yanzhong Zhang, Shanghai (CN); Yongbing Gao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 168 days.

(21) Appl. No.: 17/506,134

(22) Filed: Oct. 20, 2021

(65) Prior Publication Data

US 2022/0045512 A1 Feb. 10, 2022

Related U.S. Application Data

(63) Continuation of application No. PCT/CN2019/103019, filed on Aug. 28, 2019.

(51) Int. Cl.
*H02J 3/38* (2026.01)
*H02J 101/24* (2026.01)
(Continued)

(52) U.S. Cl.
CPC ................. *H02J 3/38* (2013.01); *H02M 1/36* (2013.01); *H02S 40/32* (2014.12); *H02J 2101/25* (2026.01)

(58) Field of Classification Search
CPC ...... H02J 3/38; H02J 2300/26; H02J 2300/24; H02J 3/381; H02J 2101/24; H02M 1/36; H02S 40/32
See application file for complete search history.

(56) References Cited

U.S. PATENT DOCUMENTS 10,218,261 B2 2/2019 Lung et al.
10,516,365 B1 * 12/2019 Serban ...................... H02J 7/35
(Continued)

FOREIGN PATENT DOCUMENTS

CN 102420456 A 4/2012
CN 202906774 U 4/2013
(Continued)

*Primary Examiner* — Rexford N Barnie
*Assistant Examiner* — Rasem Mourad
(74) *Attorney, Agent, or Firm* — Rimon PC

(57) ABSTRACT

This application discloses an inverter of a grid-connected photovoltaic power generation system. The inverter includes a grid-connected inverter unit, an alternating current auxiliary power supply, and a startup apparatus. The alternating current auxiliary power supply is configured to convert an alternating current from an alternating current power grid into a direct current. An input terminal of the grid-connected inverter unit is connected to a bus capacitor. The startup apparatus is configured to: obtain an alternating current from the alternating current power grid, convert the alternating current into a direct current, and then provide the direct current to the bus capacitor, to start the grid-connected inverter unit. By using the inverter, the grid-connected photovoltaic power generation system can be started normally when there is insufficient or no sunlight, to allow scheduling of the grid-connected photovoltaic power generation system to be normally performed.

10 Claims, 13 Drawing Sheets

(51) Int. Cl.
*H02M 1/36* (2007.01)
*H02S 40/32* (2014.01)

(56) References Cited

U.S. PATENT DOCUMENTS

| | | | | |
|---|---|---|---|---|
| 2011/0035070 | A1* | 2/2011 | Kanai | F24S 20/00 700/292 |
| 2012/0051102 | A1* | 3/2012 | Wagoner | H02J 3/40 363/49 |
| 2015/0023065 | A1* | 1/2015 | Naruse | G03G 15/5004 363/21.01 |
| 2016/0087549 | A1* | 3/2016 | Tamura | H02M 1/36 307/72 |
| 2016/0118934 | A1* | 4/2016 | Johnson | H02S 40/34 136/244 |
| 2017/0331294 | A1* | 11/2017 | Yu | H02M 3/335 |
| 2018/0006464 | A1* | 1/2018 | Judkins | H02S 40/32 |
| 2020/0052629 | A1* | 2/2020 | Baechle | F01D 15/10 |

FOREIGN PATENT DOCUMENTS

| | | | |
|---|---|---|---|
| CN | 104348347 | A | 2/2015 |
| CN | 104467016 | A | 3/2015 |
| CN | 106033895 | A | 10/2016 |
| CN | 206686099 | U | 11/2017 |
| CN | 208257654 | U | 12/2018 |
| EP | 2999108 | A1 | 3/2016 |
| JP | 2015035954 | A | 2/2015 |
| WO | 2012167691 | A1 | 12/2012 |
| WO | 2018005320 | A1 | 1/2018 |

* cited by examiner

INVERTER OF GRID-CONNECTED PHOTOVOLTAIC POWER GENERATION SYSTEM, STARTUP APPARATUS, METHOD, AND SYSTEM

CROSS-REFERENCE TO RELATED APPLICATIONS

This application is a continuation of International Application No. PCT/CN2019/103019, filed on Aug. 28, 2019, the disclosure of which is hereby incorporated by reference in its entirety.

TECHNICAL FIELD

This application relates to the field of photovoltaic power generation technologies, and in particular, to an inverter of a grid-connected photovoltaic power generation system, a startup apparatus, and related method and system.

BACKGROUND

Photovoltaic power generation is a technology that uses a photovoltaic effect of a semiconductor interface to convert light energy into electric energy. A grid-connected photovoltaic power generation system includes a solar panel and a grid-connected photovoltaic inverter unit. The grid-connected photovoltaic inverter unit may convert a direct current obtained from the solar panel into an alternating current and connect the alternating current to a power grid.

Currently, the power grid often requires the grid-connected photovoltaic power generation system to perform scheduling at night, for example, requiring the grid-connected photovoltaic power generation system to generate reactive power at night to perform power compensation. When the grid-connected photovoltaic power generation system is not started before night, the solar panel cannot supply power to the grid-connected photovoltaic inverter unit because there is no sunlight at night. As a result, the grid-connected photovoltaic inverter unit cannot be started. As such, the grid-connected photovoltaic power generation system cannot be started. Therefore, scheduling cannot be performed. However, when the grid-connected photovoltaic power generation system is already connected to the power grid and is not disconnected before night, that is, when the grid-connected photovoltaic power generation system has been started before night, the grid-connected photovoltaic power generation system cannot be restarted. When a fault alarm occurs in the grid-connected photovoltaic power generation system, the grid-connected photovoltaic power generation system stops working. After the fault is rectified, the grid-connected photovoltaic power generation system cannot be started again. This affects normal scheduling.

In short, the grid-connected photovoltaic power generation system cannot be started when there is no sunlight. Therefore, the scheduling of the grid-connected photovoltaic power generation system is affected when there is no sunlight.

SUMMARY

This application provides an inverter of a grid-connected photovoltaic power generation system, a startup apparatus, and related method and system, to normally start the grid-connected photovoltaic power generation system when there is no sunlight, so that the scheduling of the grid-connected photovoltaic power generation system can be normally performed.

According to a first aspect, a technical solution of this application provides an inverter of a grid-connected photovoltaic power generation system. The inverter includes a grid-connected inverter unit, an alternating current auxiliary power supply, and a startup apparatus. The alternating current auxiliary power supply is configured to convert an alternating current of an alternating current power grid into a direct current, and an input terminal of the grid-connected inverter unit is connected to a bus capacitor. The startup apparatus is configured to: obtain an alternating current from the alternating current power grid, convert the alternating current into a direct current, and then provide the direct current to the bus capacitor, to start the grid-connected inverter unit; or obtain a direct current from the alternating current auxiliary power supply, and provide the direct current to the bus capacitor, to start the grid-connected inverter unit.

The alternating current power grid is energized and the alternating current auxiliary power supply obtains power from the alternating current power grid. Therefore, the alternating current auxiliary power supply is also energized. That is, obtaining power from the alternating current auxiliary power supply may be considered as indirectly obtaining power from the alternating current power grid. Therefore, under an insufficient sunlight condition, for example, at nighttime or on a cloudy day, the inverter may directly or indirectly obtain power from the alternating current power grid to start the grid-connected inverter unit. That is, when an input terminal of the inverter has no power supply and the inverter cannot be started, the inverter may be started by obtaining power from the alternating current power grid. In this way, scheduling of the grid-connected photovoltaic power generation system can be normally performed.

With reference to the first aspect, in a first possible implementation, the startup apparatus includes a control unit and a startup unit. The control unit is configured to: when a start instruction is received, send the start power obtaining instruction to the startup unit. The startup unit is configured to obtain the alternating current from the alternating current power grid or obtain the direct current from the alternating current auxiliary power supply according to the start power obtaining instruction, and provide the alternating current or the direct current to the bus capacitor, to start the grid-connected inverter unit.

The control unit may directly receive the start power obtaining instruction from a power station, or may receive the start power obtaining instruction from a monitoring unit of a photovoltaic inverter system. The control unit sends the start power obtaining instruction to the startup unit, so that the startup unit obtains power to start the grid-connected inverter unit.

With reference to any one of the first aspect and the foregoing possible implementation, in a second possible implementation, when the startup unit is configured to obtain power from the alternating current power grid, the startup unit includes a rectifier circuit and a first direct current-direct current conversion circuit. The rectifier circuit is configured to convert the alternating current obtained from the alternating current power grid into the direct current, and send the direct current to the first direct current-direct current conversion circuit. The first direct current-direct current conversion circuit is configured to convert the direct current sent by the rectifier circuit, and then provide a converted direct current to the bus capacitor connected to the input terminal of the grid-connected inverter unit.

When the startup unit is configured to obtain power from the alternating current power grid, the startup unit obtains an alternating current. The startup apparatus can perform rectification and direct current-direct current conversion on the obtained alternating current, to provide a direct current that meets a requirement to the bus capacitor connected to the input terminal of the grid-connected inverter unit.

With reference to any one of the first aspect and the foregoing possible implementations, in a third possible implementation, the inverter further includes at least one or more of the following components connected in series between the alternating current power grid and the rectifier circuit: an isolation transformer, a relay, a contactor, or a circuit breaker.

The foregoing components may be connected in series, so that power consumption safety can be further improved. For example, adding the isolation transformer can prevent a primary-side winding and a secondary-side winding from a danger generated when the primary-side winding and the secondary-side winding simultaneously touch a charged body (a metal part that may be charged due to insulation damage) and the ground. In some embodiments, components such as the circuit breaker, the contactor, and the relay are connected in series, to disconnect a circuit in time to protect the circuit during a short circuit, severe overload, or under-voltage of electrical equipment.

With reference to any one of the first aspect and the foregoing possible implementations, in a fourth possible implementation, when the control unit is configured to receive the start instruction from a monitoring unit, the monitoring unit is configured to communicate between the inverter and a power station. The alternating current auxiliary power supply includes a rectifier and a second direct current-direct current conversion circuit. An input terminal of the rectifier is connected to the alternating current power grid, and an output terminal of the rectifier is connected to the second direct current-direct current conversion circuit. A direct current bus of the alternating current auxiliary power supply is a bus connected to an input terminal of the second direct current-direct current conversion circuit. An output terminal of the second direct current-direct current conversion circuit is connected to the monitoring unit, and is configured to supply power to the monitoring unit. That the startup unit is configured to obtain power from the alternating current auxiliary power supply is: obtaining, by the startup unit, the power from the direct current bus of the alternating current auxiliary power supply.

When obtaining the power from the direct current bus of the alternating current auxiliary power supply, the startup unit obtains a direct current. Therefore, the rectifier circuit that converts an alternating current into a direct current is not required. In this way, a structure of the startup apparatus is simple, and costs are reduced.

With reference to any one of the first aspect and the foregoing possible implementations, in a fifth possible implementation, the startup unit includes a third direct current-direct current conversion circuit.

The third direct current-direct current conversion circuit is configured to convert a voltage of the direct current bus of the alternating current auxiliary power supply, and then provide a converted voltage to the bus capacitor connected to the input terminal of the grid-connected inverter unit.

When the startup unit obtains the direct current from the direct current bus of the alternating current auxiliary power supply, the startup apparatus can perform direct current-direct current conversion on the obtained direct current, to provide a direct current that meets a requirement to the bus capacitor connected to the input terminal of the grid-connected inverter unit.

With reference to any one of the first aspect and the foregoing possible implementations, in a sixth possible implementation, when the control unit is configured to receive the start instruction from a monitoring unit, the monitoring unit is configured to communicate between the inverter and a power station. The alternating current auxiliary power supply includes a rectifier and a second direct current-direct current conversion circuit. An input terminal of the rectifier is connected to the alternating current power grid, and an output terminal of the rectifier is connected to the second direct current-direct current conversion circuit. A direct current bus of the alternating current auxiliary power supply is a bus connected to an input terminal of the second direct current-direct current conversion circuit. An output terminal of the second direct current-direct current conversion circuit is connected to the monitoring unit, and is configured to supply power to the monitoring unit. That the startup unit is configured to obtain power from the alternating current auxiliary power supply is: obtaining, by the startup unit, the power from the output terminal of the second direct current-direct current conversion circuit.

When obtaining the power from the output terminal of the second direct current-direct current conversion circuit, the startup unit obtains a direct current. Therefore, the startup apparatus does not need the rectifier circuit to convert an alternating current into a direct current. In this way, the structure of the startup apparatus is simpler, and the costs are reduced.

With reference to any one of the first aspect and the foregoing possible implementations, in a seventh possible implementation, when the startup unit is configured to obtain the power from the alternating current auxiliary power supply, the startup unit includes a fourth direct current-direct current conversion circuit. The fourth direct current-direct current conversion circuit is configured to convert an output voltage of the alternating current auxiliary power supply, and then provide a converted output voltage to the bus capacitor connected to the input terminal of the grid-connected inverter unit.

When the startup unit obtains the direct current from the output terminal of the alternating current auxiliary power supply, the startup apparatus can perform direct current-direct current conversion on the obtained direct current, to provide a direct current that meets a requirement to the bus capacitor connected to the input terminal of the grid-connected inverter unit.

With reference to any one of the first aspect and the foregoing possible implementations, in an eighth possible implementation, when the grid-connected photovoltaic power generation system includes a fifth direct current-direct current conversion circuit, an input terminal of the fifth direct current-direct current conversion circuit is connected to a photovoltaic unit, and an output terminal of the fifth direct current-direct current conversion circuit is connected to the input terminal of the grid-connected inverter unit. The bus capacitor is an output capacitor of the fifth direct current-direct current conversion circuit.

The fifth direct current-direct current conversion circuit may be a boost circuit, for example, and is configured to boost a voltage input to the grid-connected inverter unit, to be specific, boost a voltage output from a solar panel.

With reference to any one of the first aspect and the foregoing possible implementations, in a ninth possible implementation, the monitoring unit is further configured to: when a start success message sent by the grid-connected inverter unit is received, send an instruction for stopping working to the startup unit, so that the startup unit stops working to reduce power consumption.

With reference to any one of the first aspect and the foregoing possible implementations, in a tenth possible implementation, the rectifier circuit is a three-phase full bridge, a switching transistor in the three-phase full bridge is a diode, and the first direct current-direct current conversion circuit is a single-ended flyback circuit.

The startup apparatus may be included in the inverter, or may be used as an independent external device, that is, not included in the inverter. In this case, the inverter includes the grid-connected inverter unit and the alternating current auxiliary power supply. The startup apparatus may obtain the alternating current from the alternating current power grid, convert the alternating current into the direct current, and then provide the direct current to the bus capacitor, to start the grid-connected inverter unit. Alternatively, the startup apparatus obtains the direct current from the alternating current auxiliary power supply of the inverter and provides the direct current to the bus capacitor, to start the grid-connected inverter unit.

According to a second aspect, this application further provides a startup apparatus for starting an inverter. The inverter includes a grid-connected inverter unit and an alternating current auxiliary power supply. An input terminal of the grid-connected inverter unit is connected to a bus capacitor, and the alternating current auxiliary power supply is configured to convert an alternating current of an alternating current power grid into a direct current.

The startup apparatus includes a control unit and a startup unit. The control unit is configured to: when a start instruction is received, send the start power obtaining instruction to the startup unit. The startup unit is configured to obtain power from the alternating current power grid or obtain power from the alternating current auxiliary power supply according to the start power obtaining instruction, and provide the power to the bus capacitor, to start the grid-connected inverter unit.

The alternating current power grid is energized and the alternating current auxiliary power supply obtains power from the alternating current power grid. The alternating current auxiliary power supply also becomes energized. That is, obtaining power from the alternating current auxiliary power supply may be considered as indirectly obtaining power from the alternating current power grid. Therefore, in a no or low sunlight condition, for example, at nighttime or on a cloudy day, the startup apparatus may directly or indirectly obtain power from the alternating current power grid to start the inverter. That is, when an input terminal of the inverter has no power supply and the inverter cannot be started, the startup apparatus may be started by obtaining power from the alternating current power grid. In this way, scheduling of a grid-connected photovoltaic power generation system can be normally performed.

With reference to the second aspect, in a first possible implementation, when the startup unit is configured to obtain the power from the alternating current power grid, the startup unit includes a rectifier circuit and a first direct current-direct current conversion circuit. The rectifier circuit is configured to convert the alternating current obtained from the alternating current power grid into the direct current, and send the direct current to the first direct current-direct current conversion circuit. The first direct current-direct current conversion circuit is configured to convert the direct current sent by the rectifier circuit, and then provide a converted direct current to the bus capacitor connected to the input terminal of the grid-connected inverter unit.

When the startup unit is configured to obtain power from the alternating current power grid, the startup unit obtains an alternating current from the alternating current power grid. The startup apparatus can perform rectification and direct current-direct current conversion on the obtained alternating current, to provide a direct current that meets a requirement to the bus capacitor connected to the input terminal of the grid-connected inverter unit.

With reference to any one of the second aspect and the foregoing possible implementation, in a second possible implementation, when the startup unit is configured to obtain the power from the alternating current auxiliary power supply, the startup unit includes a fourth direct current-direct current conversion circuit. The fourth direct current-direct current conversion circuit is configured to convert an output voltage of the alternating current auxiliary power supply, and then provide a converted output voltage to the bus capacitor connected to the input terminal of the grid-connected inverter unit.

When the startup unit obtains the direct current from the output terminal of the alternating current auxiliary power supply, the startup apparatus can perform direct current-direct current conversion on the obtained direct current, to provide a direct current that meets a requirement to the bus capacitor connected to the input terminal of the grid-connected inverter unit.

According to a third aspect, this application further provides a starting method of a grid-connected photovoltaic power generation system. The method is applied to a startup apparatus, and the startup apparatus includes a control unit and a startup unit. The method includes: when the control unit receives a start instruction, feeding back, by the startup unit, power obtained from an alternating current power grid or power obtained from an alternating current auxiliary power supply to a bus capacitor connected to an input terminal of a grid-connected inverter unit in the grid-connected photovoltaic power generation system, to start the grid-connected inverter unit.

The alternating current power grid is energized and the alternating current auxiliary power supply obtains power from the alternating current power grid. Therefore, the alternating current auxiliary power supply is also energized. Therefore, in a non-sunlight condition, for example, a nighttime or a cloudy day, an inverter may directly or indirectly obtain power from the alternating current power grid to start the grid-connected inverter unit. In this way, scheduling of the grid-connected photovoltaic power generation system can be normally performed.

With reference to the third aspect, in a first possible implementation, the method further includes: when a start success message sent by the grid-connected inverter unit is received, controlling the startup unit to stop working. If the startup unit stops working when it is not needed, this reduces power consumption.

According to a fourth aspect, this application further provides a grid-connected photovoltaic power generation system, including the inverter in any one of the foregoing implementations, and further including a boost circuit. An input terminal of the boost circuit is connected to a solar panel, and an output terminal of the boost circuit is connected to an input terminal of a grid-connected inverter unit in the grid-connected photovoltaic power generation system. A bus capacitor connected to the input terminal of the grid-connected inverter unit is an output capacitor of the boost circuit, and the boost circuit is configured to boost a voltage output from the solar panel.

It can be learned from the foregoing technical solutions that the embodiments of this application have the following advantages.

The inverter of the grid-connected photovoltaic power generation system provided in this embodiment of this application includes the startup apparatus. The startup apparatus can be configured to: obtain the alternating current from the alternating current power grid, convert the alternating current into the direct current, and then provide the direct current to the bus capacitor, to start the grid-connected inverter unit; or obtain the direct current from the alternating current auxiliary power supply and provide the direct current to the bus capacitor, to start the grid-connected inverter unit. When there is no sunlight, because the solar panel cannot supply power to the inverter, the input terminal of the grid-connected inverter unit has no power supply. However, in this application, the alternating current power grid or the alternating current auxiliary power supply is used to supply power to feed to the input terminal of the grid-connected inverter unit. The alternating current auxiliary power supply obtains power from the alternating current power grid. Therefore, the alternating current auxiliary power supply is also energized. That is, obtaining power from the alternating current auxiliary power supply may be considered as indirectly obtaining power from the alternating current power grid. Therefore, in the non-sunlight condition, for example, the nighttime or the cloudy day, the device may directly or indirectly obtain power from the alternating current power grid to start the grid-connected inverter unit. Therefore, when the input terminal of the inverter has no power supply and the inverter cannot be started, the device can be started by obtaining power from the alternating current power grid. In this way, normal scheduling of the grid-connected photovoltaic power generation system can be performed.

DESCRIPTION OF EMBODIMENTS

To make a person skilled in the art better understand this solution, the following first describes a working principle of a grid-connected photovoltaic power generation system.

Figure 1:
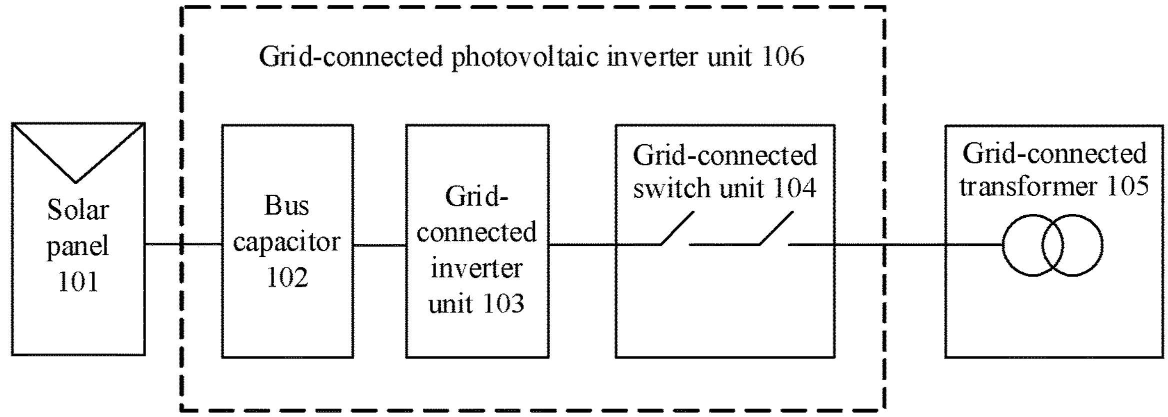
FIG. 1 is a schematic diagram of a grid-connected photovoltaic power generation system according to an embodiment of this application.

FIG. 1 is a schematic diagram of a grid-connected photovoltaic power generation system according to an embodiment of this application.

The grid-connected photovoltaic power generation system includes a solar panel 101, a grid-connected photovoltaic inverter unit 106, and a grid-connected transformer 105.

The grid-connected photovoltaic inverter unit includes a bus capacitor 102, a grid-connected inverter unit 103, and a grid-connected switch unit 104.

The grid-connected photovoltaic inverter unit 106 can convert a direct current obtained from the solar panel into an alternating current, and output the alternating current to the grid-connected transformer 105 to connect to a power grid.

The bus capacitor 102 is configured to filter out an alternating current component of a bus.

The grid-connected inverter unit 103 is configured to convert a direct current into an alternating current.

The grid-connected switch unit 104 is configured to disconnect the grid-connected photovoltaic power generation system when a fault alarm occurs in the grid-connected photovoltaic power generation system, so that the grid-connected photovoltaic power generation system stops working, to protect the grid-connected photovoltaic power generation system. The grid-connected switch unit 104 includes a grid-connected switch, and the grid-connected switch may be a circuit breaker, a contactor, or the like. An on/off state of the grid-connected switch is controlled to control a connection status of the grid-connected inverter unit 103 and an alternating current power grid.

The grid-connected transformer 105 is configured to convert an alternating current output from the grid-connected inverter unit 103, and then feed a converted alternating current to the alternating current power grid.

Currently, the power grid often requires the grid-connected photovoltaic power generation system to perform scheduling under a non-sunlight working condition, for example, requires the grid-connected photovoltaic power generation system to generate reactive power at night to perform power compensation. It may be understood that the no or low sunlight working condition may further include a cloudy day, a rainy day, or the like. The following uses a nighttime as an example for description.

When the grid-connected photovoltaic power generation system is not started in advance before night, the solar panel cannot output electric energy because there is no or insufficient sunlight, for example, on a cloudy day or a rainy day, or the electric energy output by the solar panel is too low to start the grid-connected photovoltaic inverter unit. As a result, normal scheduling cannot be performed.

However, when the grid-connected photovoltaic power generation system has been connected to the power grid and is not disconnected before night, that is, when the grid-connected photovoltaic power generation system has been started before night, the grid-connected photovoltaic power generation system cannot be restarted. When the fault alarm occurs in the grid-connected photovoltaic power generation system, to protect the grid-connected photovoltaic power generation system, the grid-connected switch of the grid-connected switch unit 104 needs to be turned off. After a fault is rectified, the grid-connected photovoltaic power generation system cannot be started again, thereby affecting scheduling.

To resolve the foregoing technical problem, embodiments of this application provide an inverter of a grid-connected photovoltaic power generation system, a startup apparatus, a method, and a system. When there is no sunlight, there is no power supply at an input terminal of the inverter. Therefore, in this application, power obtained from the alternating current power grid or an alternating current auxiliary power supply is fed to an input terminal of the grid-connected inverter unit. The alternating current auxiliary power supply obtains power from the alternating current power grid. Therefore, the alternating current auxiliary power supply is also energized. That is, obtaining power from the alternating current auxiliary power supply may be considered as indirectly obtaining power from the alternating current power grid. Therefore, power may directly or indirectly obtained from the alternating current power grid when there is no sunlight, to start the grid-connected inverter unit. Therefore, when the input terminal of the grid-connected inverter unit has no power supply and the grid-connected inverter unit cannot be started, the device may start the grid-connected inverter unit by obtaining power from the alternating current power grid.

To make a person skilled in the art understand better, the following describes the technical solutions in the embodiments of this application with reference to accompanying drawings in the embodiments of this application. It may be understood that terms such as "first" and "second" in the embodiments of this application are merely used for ease of description, and do not constitute a limitation on the embodiments of this application.

Apparatus Embodiment 1

This embodiment of this application provides an inverter of a grid-connected photovoltaic power generation system. The following provides descriptions with reference to the accompanying drawing.

Figure 2:
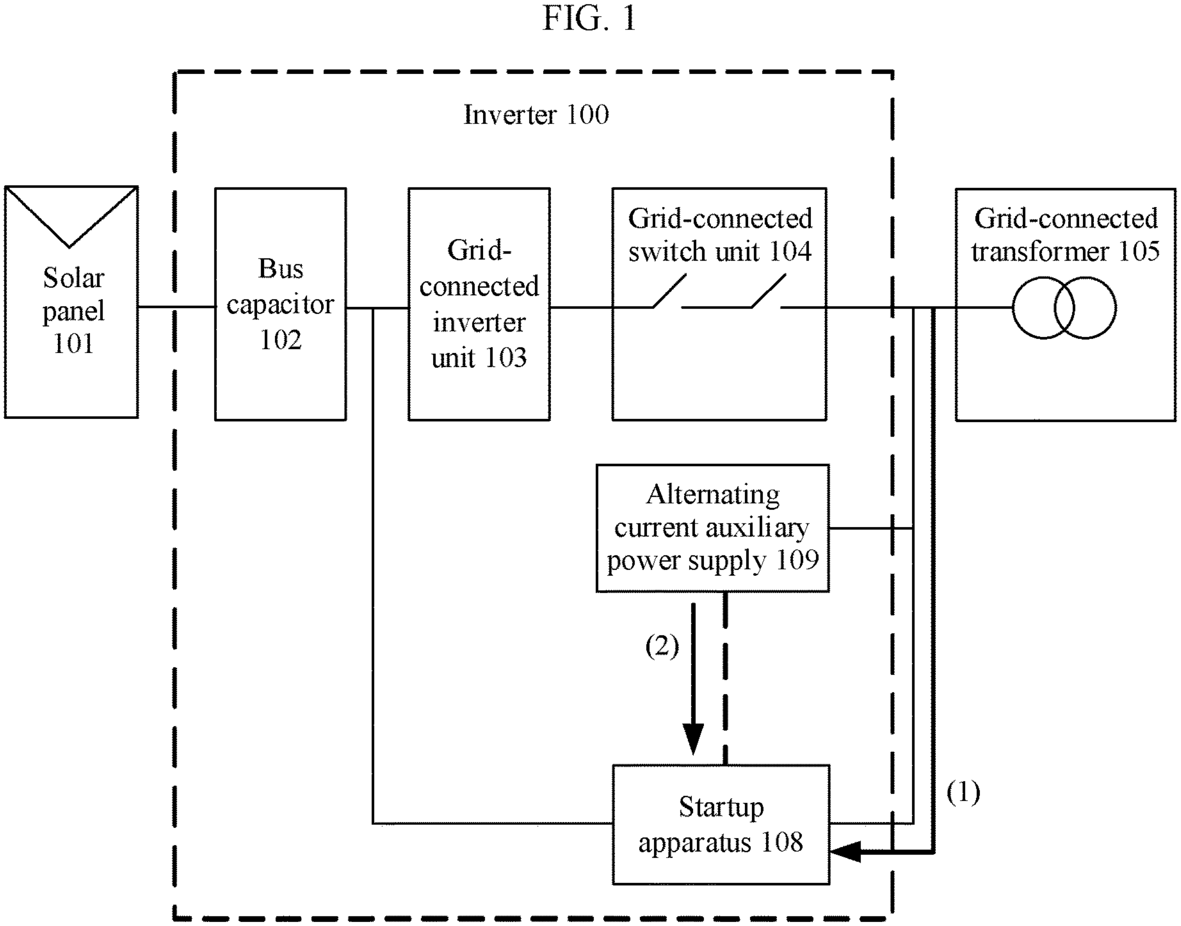
FIG. 2 is a schematic diagram of an inverter of a grid-connected photovoltaic power generation system according to an embodiment of this application.

FIG. 2 is a schematic diagram of an inverter 100 of a grid-connected photovoltaic power generation system according to an embodiment of this application.

The inverter 100 includes a grid-connected inverter unit 103, a grid-connected switch unit 104, an alternating current auxiliary power supply 109, and a startup apparatus 108.

The inverter 100 shown in the figure further includes a bus capacitor 102. It may be understood that the bus capacitor 102 may not be included in the inverter 100, to be specific, the grid-connected inverter unit 103 is connected to the bus capacitor 102 outside the inverter 100. Further, when a grid-connected photovoltaic inverter unit uses a boost (boost) circuit to maintain voltage stability and perform MPPT (maximum power point tracking) adjustment, the bus capacitor 102 may be an output capacitor of the boost circuit. Correspondingly, the inverter may include the boost circuit, or may not include the boost circuit, to be specific, the grid-connected inverter unit 103 is connected to the boost circuit outside the inverter 100.

The alternating current auxiliary power supply 109 is configured to convert an alternating current of an alternating current power grid into a direct current.

An input terminal of the grid-connected inverter unit 103 is connected to the bus capacitor 102, and an output terminal of the grid-connected inverter unit 103 is connected to the alternating current power grid by using the grid-connected switch unit 104. The grid-connected switch unit 104 includes a grid-connected switch. When the grid-connected switch is turned on, the grid-connected inverter unit 103 is connected to the alternating current power grid. When the grid-connected switch is turned off, the grid-connected inverter unit 103 is disconnected from the alternating current power grid.

The startup apparatus 108 is configured to: obtain an alternating current from the alternating current power grid, convert the alternating current into a direct current, and then provide the direct current to the bus capacitor 102, to start the grid-connected inverter unit, as shown by an arrow (1) in the figure; or obtain a direct current from the alternating current auxiliary power supply and provide the direct current to the bus capacitor 102, to start the grid-connected inverter unit, as shown by arrow (2) in the figure.

A direct current voltage fed by the startup apparatus 108 to the bus capacitor 102 needs to be greater than or equal to a grid voltage of the grid-connected photovoltaic power generation system, so that an output voltage of the grid-connected photovoltaic inverter unit 106 can be input into the alternating current power grid. Generally, a voltage fed to the bus capacitor 102 is greater than the grid voltage of the grid-connected photovoltaic power generation system.

The inverter of the grid-connected photovoltaic power generation system provided in this embodiment of this application includes the startup apparatus. The startup apparatus can be configured to: obtain the alternating current from the alternating current power grid, convert the alternating current into the direct current, and then provide the direct current to the bus capacitor, to start the grid-connected inverter unit; or obtain the direct current from the alternating current auxiliary power supply and provide the direct current to the bus capacitor, to start the grid-connected inverter unit. When there is no sunlight, because the solar panel cannot supply power to the inverter, the input terminal of the grid-connected inverter unit has no power supply. However, in this application, the alternating current power grid or the alternating current auxiliary power supply is used to supply power to the input terminal of the grid-connected inverter unit. The alternating current auxiliary power supply obtains power from the alternating current power grid. Therefore, the alternating current auxiliary power supply is also energized. That is, obtaining power from the alternating current auxiliary power supply may be considered as indirectly obtaining power from the alternating current power grid. Therefore, in a no or low sunlight condition, for example, a nighttime or a cloudy day, the device may directly or indirectly obtain power from the alternating current power grid to start the grid-connected inverter unit. Therefore, when an input terminal of the inverter has no power supply and the inverter cannot be started, the device may be started by obtaining power from the alternating current power grid.

In apparatus Embodiment 1, an example in which the startup apparatus is included in the inverter is used for description. It may be understood that the startup apparatus may alternatively be used as an independent external device, that is, not included in the inverter. In this case, the inverter includes the grid-connected inverter unit and the alternating current auxiliary power supply. The startup apparatus may obtain the alternating current from the alternating current power grid, convert the alternating current into the direct current, and then provide the direct current to the bus capacitor, to start the grid-connected inverter unit. Alternatively, the startup apparatus obtains the direct current from the alternating current auxiliary power supply of the inverter and provides the direct current to the bus capacitor, to start the grid-connected inverter unit.

The following apparatus embodiments of this application describe a working principle of the startup apparatus. The following description does not specifically limit whether the startup apparatus is located inside the inverter or is independent of the inverter. However, it may be understood that the following specific descriptions of the startup apparatus are all applicable to two cases in which the startup apparatus is located inside the inverter and the startup apparatus is independent of the inverter.

Apparatus Embodiment 2

This embodiment of this application provides a startup apparatus of a grid-connected photovoltaic power generation system. The following provides specific descriptions with reference to the accompanying drawing.

Figure 3:
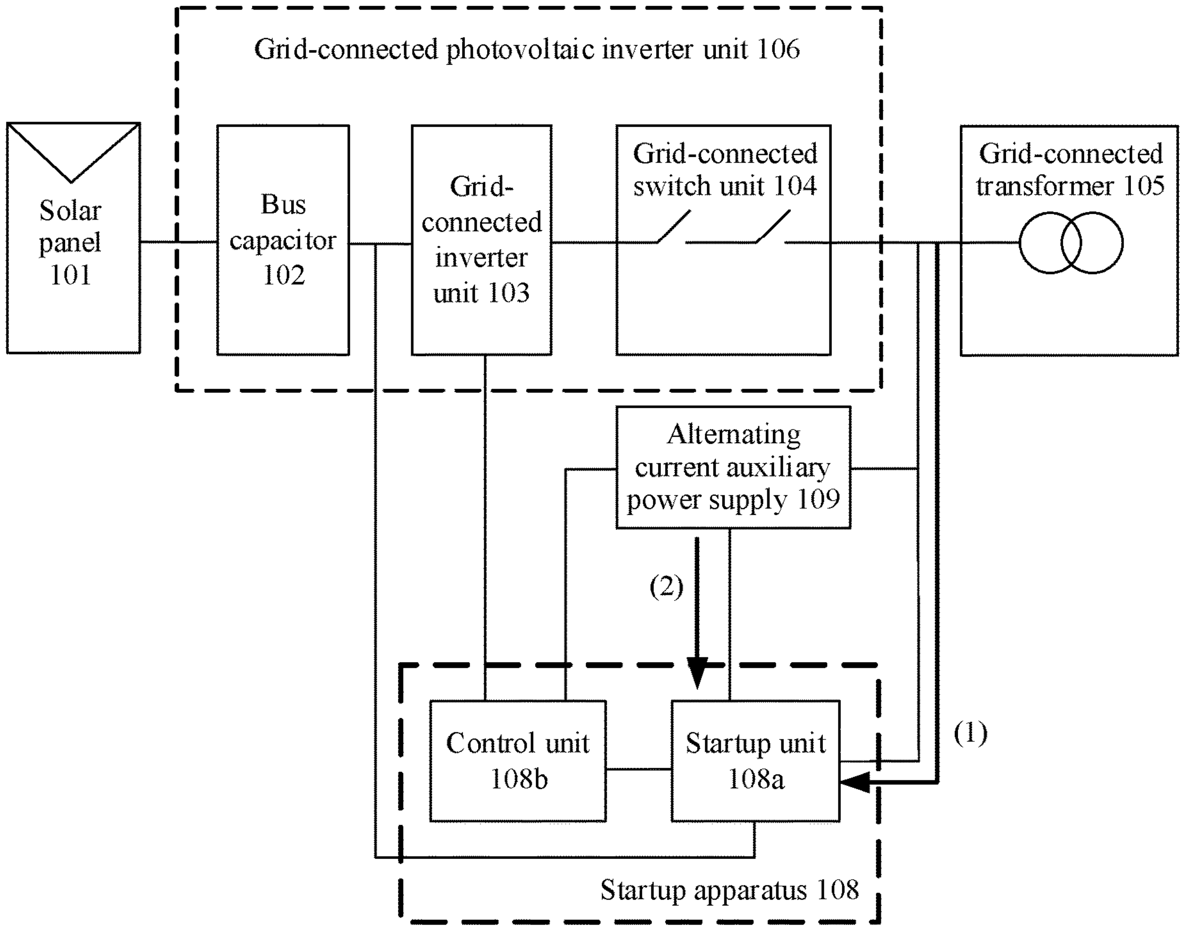
FIG. 3 is a schematic diagram of a startup apparatus of a grid-connected photovoltaic power generation system according to an embodiment of this application.

FIG. 3 is a schematic diagram of a startup apparatus of a grid-connected photovoltaic power generation system according to an embodiment of this application.

The startup apparatus 108 includes a control unit 108*b* and a startup unit 108*a*.

The control unit 108*b* is configured to: when a start instruction is received, send the start power obtaining instruction to the startup unit 108*a*.

The startup unit 108*a* is configured to: when the start power obtaining instruction is received, obtain power from an alternating current power grid, as shown by arrow (1) in the figure; or obtain power from an alternating current auxiliary power supply, as shown by arrow (2) in the figure. After obtaining the power, the startup apparatus 108 feeds the power to a bus capacitor 102 connected to an input terminal of a grid-connected inverter unit 103 in the grid-connected photovoltaic power generation system, to start the grid-connected inverter unit 103.

When a grid-connected photovoltaic inverter unit uses a boost circuit to maintain voltage stability and perform MPPT (maximum power point tracking) adjustment, the bus capacitor 102 may be an output capacitor of the boost circuit.

When obtaining power from the alternating current power grid, the startup apparatus 108 obtains an alternating current, and the startup apparatus 108 converts the obtained alternating current into a direct current of a preset amplitude, and then feeds the direct current of the preset amplitude to the bus capacitor 102 connected to the input terminal of the grid-connected inverter unit 103.

The grid-connected inverter unit 103 includes a rectifier circuit and a controller. The rectifier circuit of the grid-connected inverter unit 103 is configured to convert a direct current into an alternating current for output. The controller of the grid-connected inverter unit 103 is configured to: control the rectifier circuit of the grid-connected inverter unit 103 to work, and further control a working state of a grid-connected switch in a grid-connected switch unit 104.

The alternating current auxiliary power supply 109 can obtain power from the alternating current power grid, and convert the obtained alternating current to supply power to the controller corresponding to the grid-connected inverter unit. In addition, a fan is disposed outside the grid-connected inverter unit, and the alternating current auxiliary power supply 109 is also configured to supply power to the fan.

When the startup apparatus 108 obtains power from the alternating current auxiliary power supply 109, the startup apparatus 108 may obtain the power from a direct current bus of the alternating current auxiliary power supply 109. In this case, the startup apparatus 108 obtains a direct current. Alternatively, power may be obtained from a direct current output terminal of the alternating current auxiliary power supply 109. In this case, the startup apparatus 108 also obtains a direct current. This is not specifically limited in this embodiment of this application.

The startup apparatus 108 converts the direct current obtained from the alternating current auxiliary power supply 109 into the direct current of the preset amplitude, and then feeds the direct current of the preset amplitude to the bus capacitor 102 connected to the input terminal of the grid-connected inverter unit 103.

A direct current voltage fed by the startup apparatus 108 to the bus capacitor 102 needs to be greater than or equal to a grid voltage of the grid-connected photovoltaic power generation system, so that an output voltage of the grid-connected photovoltaic inverter unit 106 can be input into the alternating current power grid. Generally, a voltage fed to the bus capacitor 102 is greater than the grid voltage of the grid-connected photovoltaic power generation system. The following provides more detailed descriptions.

U1 represents a valid value of the grid voltage of the grid-connected photovoltaic power generation system, and U2 represents the direct current voltage input by the startup apparatus 108 to the bus capacitor 102. Because a voltage of the alternating current power grid fluctuates, when the fluctuation of the voltage of the alternating current power grid is greater than U1, k represents a voltage fluctuation ratio of the alternating current power grid. To ensure that U2 is greater than U1, so that the grid-connected photovoltaic power generation system can still be normally started when the voltage of the alternating current power grid fluctuates, U1 may be determined by using the following formula:

$$U2=\sqrt{2}\times k\times U1 \tag{1}$$

The product of $\sqrt{2}$ and U1 in the formula (1) is an amplitude of the grid voltage of the grid-connected photovoltaic power generation system, a value range of k may be 1 to 1.5, and a value of k may be determined based on an actual fluctuation status of the voltage of the alternating current power grid. This is not specifically limited in this application.

An example in which a grid-connected photovoltaic power generation system in which a direct current voltage input by a solar panel 101 is 1000 V is used for description. The valid value U1 of the grid voltage is equal to 500 V, and when the voltage fluctuation ratio k is equal to 1.2, it is determined according to the formula (1) that the direct current voltage U2 input by the startup apparatus 108 to the bus capacitor 102 is equal to 848.5 V.

The startup apparatus 108 converts the obtained alternating current into a direct current, and then feeds the direct current to the bus capacitor 102 connected to the input terminal of the grid-connected inverter unit 103, so that the grid-connected inverter unit 103 starts to work.

When the controller of the grid-connected inverter unit 103 controls the grid-connected switch included in the grid-connected switch unit 104 to be turned on, the grid-connected inverter unit 103 is connected to a grid-connected transformer 105 by using the grid-connected switch unit 104. In this case, the grid-connected inverter unit 103 may directly obtain power from the alternating current power grid to maintain a working state of the grid-connected inverter unit 103, that is, the grid-connected photovoltaic inverter unit 106 is started.

After the grid-connected photovoltaic inverter unit 106 is started, that is, after the grid-connected photovoltaic power generation system is started, the startup apparatus 108 may stop working to reduce power consumption.

It may be understood that power of the startup apparatus 108 is determined by a power loss that occurs in a starting process of the grid-connected photovoltaic inverter unit 106. A larger power loss indicates a higher power of the startup apparatus 108.

When receiving the start instruction, the startup apparatus of the grid-connected photovoltaic power generation system provided in this embodiment of this application can obtain power from the alternating current power grid or obtain power from the alternating current auxiliary power supply and feed the power to the bus capacitor connected to the input terminal of the grid-connected inverter unit in the grid-connected photovoltaic power generation system, to start the grid-connected inverter unit. The alternating current power grid is energized and the alternating current auxiliary power supply obtains power from the alternating current power grid. Therefore, the alternating current auxiliary power supply is also energized. Therefore, a power obtaining time of the startup apparatus is not limited, to be specific, when there is no sunlight, the startup apparatus can still start the grid-connected inverter unit based on a scheduling requirement, without connecting the grid-connected photovoltaic power generation system to the power grid in advance and keeping the grid-connected photovoltaic power generation system connected to the power grid. Even if the grid-connected photovoltaic power generation system is suspended due to a fault, after the fault is rectified, the startup apparatus can still normally restart the grid-connected photovoltaic power generation system. In this way, the scheduling of the grid-connected photovoltaic power generation system can be normally performed.

Apparatus Embodiment 3

It should be noted that the control unit in the startup apparatus provided in this embodiment of this application may directly receive the start power obtaining instruction from a power station, or may receive the start power obtaining instruction from a monitoring unit. The following uses an example in which the control unit receives the start power obtaining instruction from the monitoring unit for description. Specifically, the monitoring unit can receive the start instruction from the power station, and then forward the start instruction to the control unit, and the control unit controls the startup unit to work, to complete a process of starting the grid-connected photovoltaic inverter unit. In addition, after the grid-connected photovoltaic inverter unit is started, the grid-connected photovoltaic inverter unit is turned off in time to reduce power consumption. The following provides specific descriptions with reference to the accompanying drawing.

Figure 4:
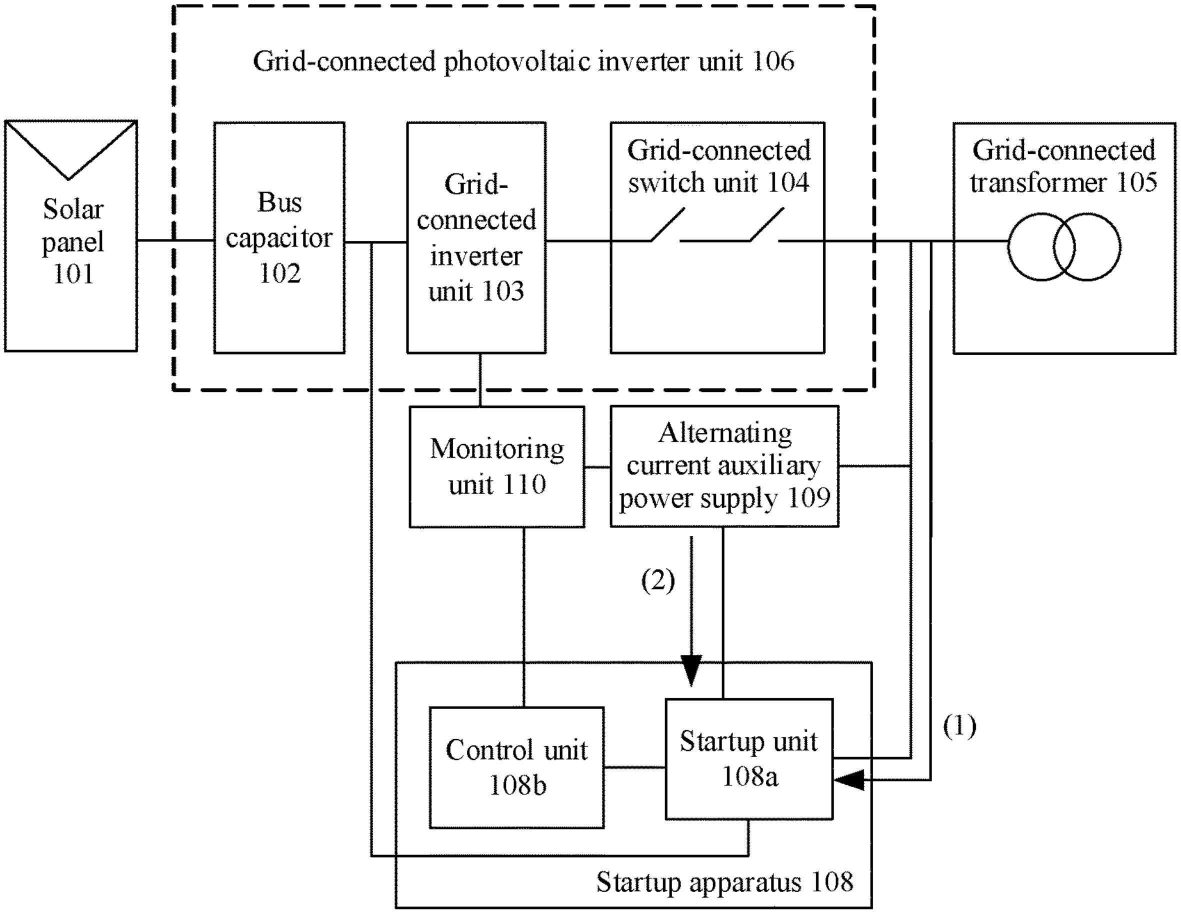
FIG. 4 is a schematic diagram of a startup apparatus of another grid-connected photovoltaic power generation system according to an embodiment of this application.

FIG. 4 is a schematic diagram of a startup apparatus of another grid-connected photovoltaic power generation system according to an embodiment of this application.

The startup apparatus 108 includes a startup unit **108*a* and a control unit 108*b*. The control unit 108*b* receives a start instruction from a monitoring unit, and the monitoring unit 110 is configured to receive the start instruction from a power station, and forward the start instruction to the control unit 108*b***.

The monitoring unit 110 is further configured to interact with a controller (not shown in the figure) of a grid-connected inverter unit 103.

The startup unit **108*a* is configured to: when the start instruction is received, obtain power from an alternating current power grid or obtain power from an alternating current auxiliary power supply, and feed the power to a bus capacitor 102 connected to an input terminal of the grid-connected inverter unit 103 in the grid-connected photovoltaic power generation system, to start the grid-connected inverter unit 103. Specifically, a direct current voltage input by the startup unit 108*a* to the bus capacitor 102 needs to be greater than a grid voltage of the grid-connected photovoltaic power generation system, so that an output voltage of a grid-connected photovoltaic inverter unit 106** can be input to the alternating current power grid.

The controller of the grid-connected inverter unit 103 controls a rectifier circuit of the grid-connected inverter unit 103 to work, and further controls a grid-connected switch of the grid-connected switch unit 104 to be turned on. After the grid-connected switch is turned on, the grid-connected inverter unit 103 may obtain power from the alternating current power grid by using the grid-connected switch unit 104.

When detecting that the grid-connected switch of the grid-connected switch unit 104 is turned on and determining the rectifier circuit of the grid-connected inverter unit 103 did not generate an alarm, the controller of the grid-connected inverter unit 103 determines that the grid-connected photovoltaic inverter unit 106 is started and grid-connected successfully. In this case, the controller of the grid-connected inverter unit 103 sends a start success message to the monitoring unit 110.

The monitoring unit 110 is further configured to: when the start success message sent by the grid-connected inverter unit 103 is received, send an instruction to the startup unit **108*a*** so that the startup unit stops working to reduce power consumption.

When there is no sunlight, the startup apparatus provided in this embodiment of this application can still start the grid-connected photovoltaic inverter unit based on a scheduling requirement, without connecting the grid-connected photovoltaic power generation system to the power grid before night and keeping the grid-connected photovoltaic power generation system connected to the power grid. Even if the grid-connected photovoltaic power generation system is suspended due to a fault, after the fault is rectified, the startup apparatus can still normally restart the grid-connected photovoltaic power generation system. In this way, scheduling of the grid-connected photovoltaic power generation system can be normally performed. The monitoring unit of the startup apparatus can control a working state of the startup unit. When obtaining the start instruction sent by the power station, the monitoring unit controls the startup unit to start to work, so that the grid-connected inverter unit starts in time. When receiving the start success message sent by the grid-connected inverter unit, the monitoring unit controls the startup unit to stop working, to reduce power consumption.

Because the startup apparatus can obtain power from the alternating current power grid or the alternating current auxiliary power supply, the following separately describes the working principles of obtaining power by the startup apparatus from the alternating current power grid and the alternating current auxiliary power supply with reference to the accompanying drawings. First, the working principle of obtaining power by the startup apparatus from the alternating current power grid is described. The following embodiment is described by using an example in which the control unit in the startup apparatus receives the start instruction from the monitoring unit.

Apparatus Embodiment 4

A startup apparatus obtains power from an alternating current power grid.

Figure 5A:
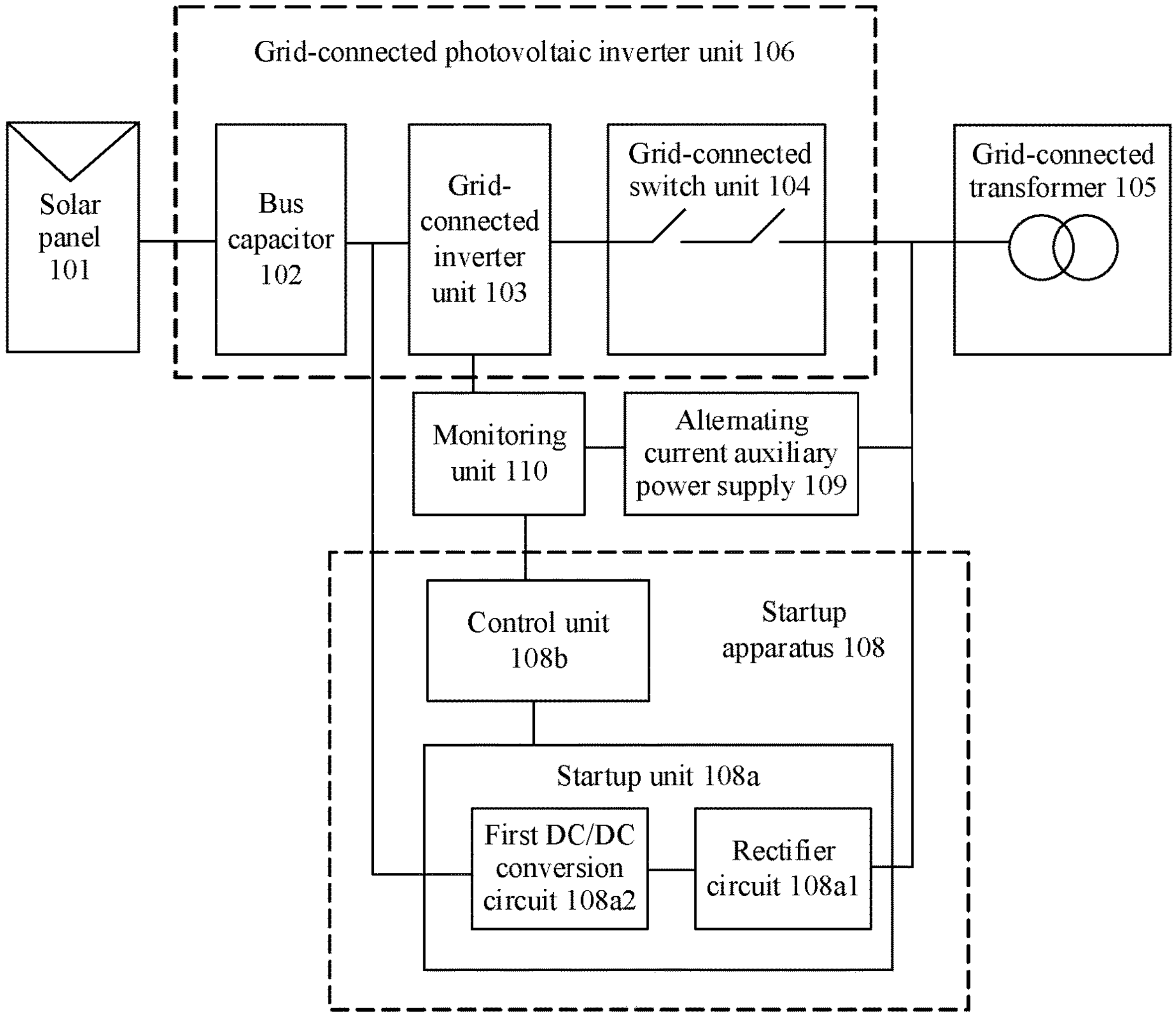
FIG. 5*a* is a schematic diagram of obtaining power by a startup apparatus from an alternating current power grid according to an embodiment of this application.

FIG. 5*a* is a schematic diagram of obtaining power by a startup apparatus from an alternating current power grid according to an embodiment of this application.

One terminal of the startup apparatus 108 is connected to a bus capacitor 102 connected to an input terminal of a grid-connected inverter unit 103, and the other terminal is connected to a grid-connected transformer 105 of the alternating current power grid.

The startup apparatus 108 includes a startup unit 108*a* and a control unit 108*b*.

The startup unit 108*a* includes a rectifier circuit 108*a*1 and a first DC-DC (direct current-direct current) conversion circuit 108*a*2.

The rectifier circuit 108*a*1 is configured to convert an alternating current obtained from the alternating current power grid into a direct current, and send the direct current to the first DC-DC conversion circuit 108*a*2. An input terminal of the rectifier circuit 108*a*1 is connected to the alternating current power grid, and an output terminal of an rectifier circuit 108*a*1 is connected to an input terminal of the first DC-DC conversion circuit 108*a*2.

An output terminal of the first DC-DC conversion circuit 108*a*2 is an output terminal of the startup apparatus 108, and the first DC-DC conversion circuit 108*a*2 is configured to convert the direct current sent by the rectifier circuit 108*a*1 and then provide a converted direct current to the bus capacitor connected to the input terminal of the grid-connected inverter unit.

The rectifier circuit 108*a*1 may be a single-phase non-control rectifier circuit or a three-phase non-control rectifier circuit, and the first DC-DC conversion circuit 108*a*2 may be a single-ended flyback circuit or a forward isolation circuit. This is not specifically limited in this embodiment of this application.

Figure 5B:
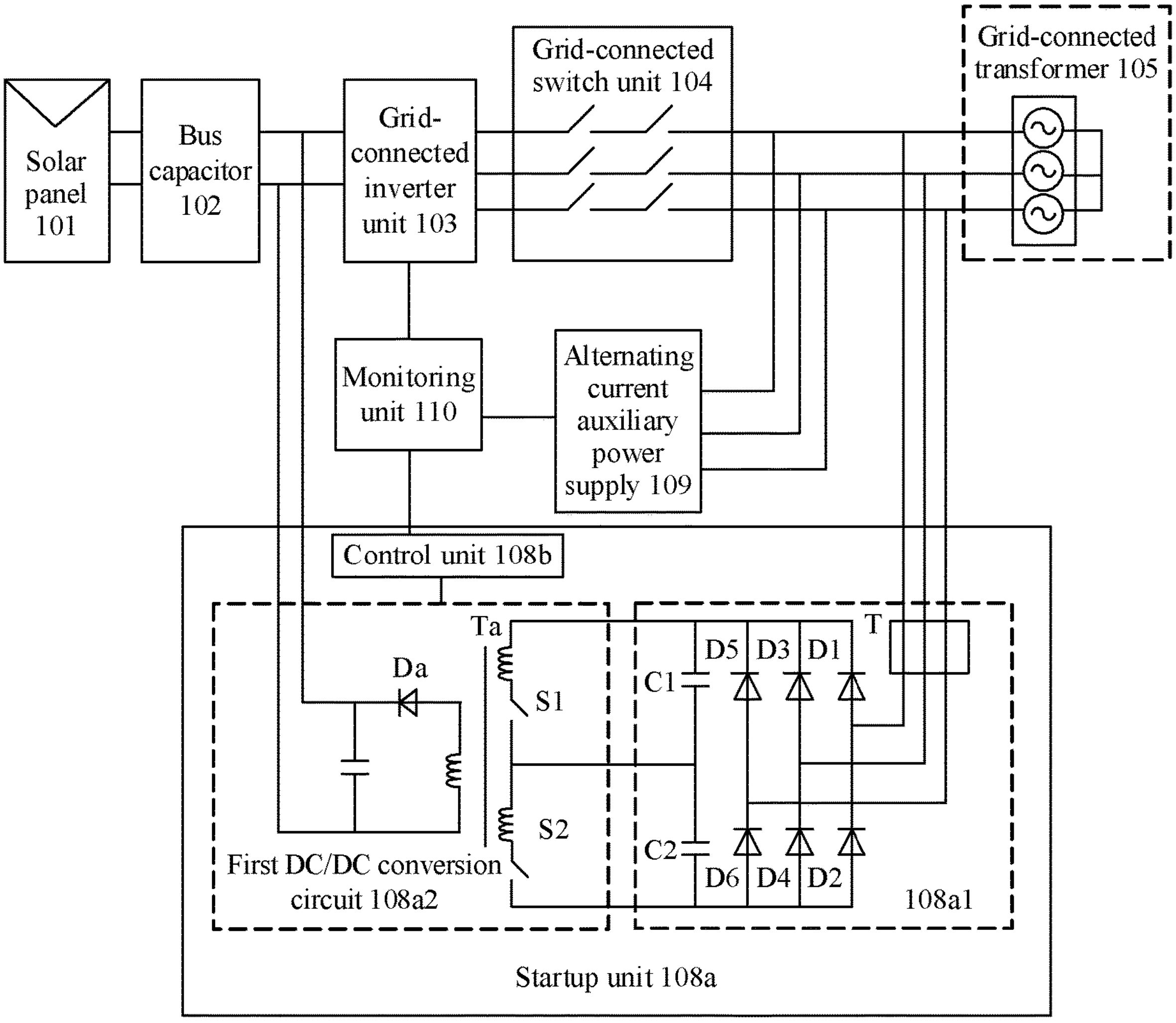
FIG. 5*b* is a schematic diagram of a startup unit according to an embodiment of this application.

FIG. 5*b* is a schematic diagram of a startup unit according to an embodiment of this application.

A rectifier circuit 108*a*1 is a three-phase non-control rectifier circuit. The rectifier circuit 108*a*1 includes a three-phase full bridge, and a switching transistor of the three-phase full bridge is a diode, that is, a diode D1 to a diode D6.

A first DC-DC conversion circuit 108*a*2 is a single-ended flyback circuit.

For a grid-connected photovoltaic power generation system in which a direct current voltage input by a solar panel 101 is 1000 V, when a valid value U1 of a grid voltage is equal to 500 V and a voltage fluctuation ratio k is equal to 1.2, it may be determined according to the formula (1) that an output voltage of the first DC-DC conversion circuit 108*a*2 may be selected as 850 V.

For a grid-connected photovoltaic power generation system in which a direct current voltage input by a solar panel 101 is 1500 V, when a valid value U1 of a grid voltage is equal to 850 V and a voltage fluctuation ratio k is equal to 1.2, it may be determined according to the formula (1) that an output voltage of the first DC-DC conversion circuit 108*a*2 may be selected as 1450 V.

A single-stage grid-connected photovoltaic power generation system in which a direct current voltage input by a solar panel 101 is 1000 V does not use a boost circuit as a pre-stage circuit of a grid-connected inverter unit. Therefore, a voltage of the alternating current power grid is relatively low. For example, when a valid value U1 of a grid voltage is equal to 80 V and a voltage fluctuation ratio k is equal to 1.2, it may be determined according to the formula (1), that an output voltage of the first DC-DC conversion circuit 108*a*2 may be selected as 650 V.

For a single-stage grid-connected photovoltaic power generation system in which a direct current voltage input by a solar panel 101 is 1500 V, when a valid value U1 of a grid voltage is equal to 600 V and a voltage fluctuation ratio k is equal to 1.2, it may be determined according to the formula (1) that an output voltage of the first DC-DC conversion circuit 108*a*2 may be selected as 1200 V.

It may be understood that the input terminal of the rectifier circuit 108*a*1 may be directly connected to the alternating current power grid, or may be connected in series to any one or more of the following components: an isolation transformer, a contactor, a relay, or a circuit breaker. To be specific, T in the figure may be the isolation transformer, the circuit breaker, or the isolation transformer and the circuit breaker that are connected in series.

The isolation transformer may be a grid frequency isolation transformer, and a working frequency of the isolation transformer is the same as that of a mains. A primary-side winding and a secondary-side winding are electrically isolated from each other, and a secondary-side circuit is floated to the ground, to avoid a danger generated when both sides simultaneously touch a charged body (a metal part that may be charged due to insulation damage) and the ground, so as to ensure power consumption safety.

An air switch may be used for the circuit breaker, so that a circuit can be disconnected in time to protect the circuit during a short circuit, and severe overload and undervoltage of electrical equipment.

Figure 6:
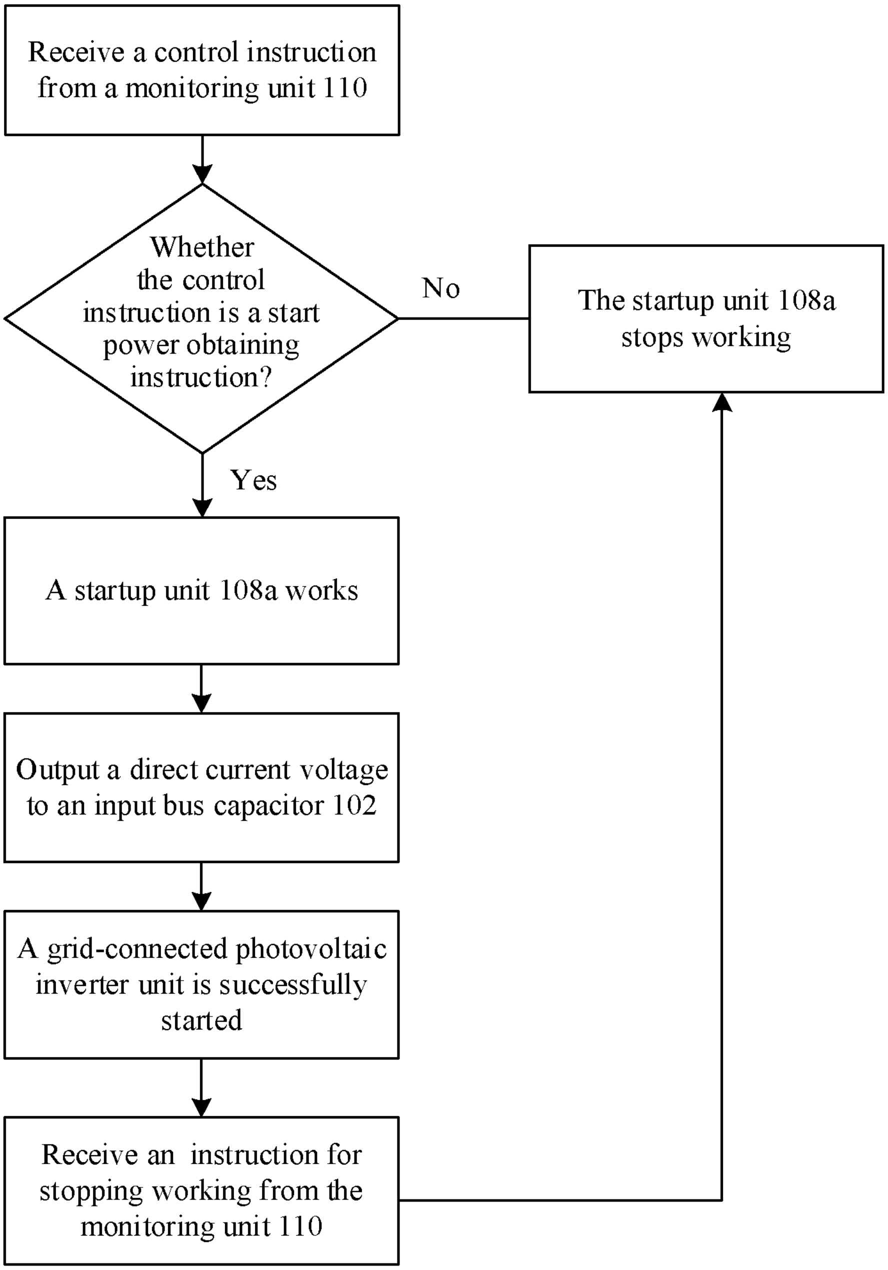
FIG. 6 is a working flowchart of a startup apparatus according to an embodiment of this application.

FIG. 6 is a working flowchart of a startup apparatus according to an embodiment of this application.

When a solar panel 101 has power, a grid-connected photovoltaic power generation system is normally grid-connected to work, to be specific, a grid-connected photovoltaic inverter unit is in a starting state. A control unit 108*b* receives a control instruction for stopping working sent by a monitoring unit 110, and keeps stopping working to reduce power consumption.

When there is no sunlight, the solar panel and an input bus capacitor cannot supply power, and when the grid-connected photovoltaic power generation system needs to be started, the monitoring unit 110 receives a start power obtaining instruction sent by a power station, and sends the start power obtaining instruction to the control unit 108*b*.

The control unit 108*b* controls a rectifier circuit 108*a*1 and a first DC-DC conversion circuit 108*a*2 to start to work, and outputs a direct current voltage to a bus capacitor 102 connected to an input terminal of a grid-connected inverter unit 103, so that the grid-connected photovoltaic inverter unit is started and grid-connected.

The monitoring unit 110 may monitor a working state of an rectifier circuit in the grid-connected inverter unit 103, and when the rectifier circuit has no alarm, it may be determined that the grid-connected photovoltaic inverter unit is successfully started.

After the grid-connected photovoltaic inverter unit is started and grid-connected, the control unit 108*b* receives the instruction for stopping working sent by the monitoring unit 110, and controls a startup unit 108*a* to stop working, to reduce power consumption.

When there is no sunlight, the startup apparatus provided in this embodiment of this application can still start the grid-connected photovoltaic inverter unit based on a scheduling requirement, without connecting the grid-connected photovoltaic power generation system to the power grid in advance and keeping the grid-connected photovoltaic power generation system connected to the power grid. Even if the grid-connected photovoltaic power generation system is suspended due to a fault, after the fault is rectified, the startup apparatus can still normally restart the grid-connected photovoltaic power generation system. In this way, scheduling of the grid-connected photovoltaic power generation system can be normally performed. In addition, the monitoring unit of the startup apparatus can control a working state of the startup unit. When obtaining the start instruction sent by the power station, the monitoring unit controls the startup unit to start to work, to start the grid-connected inverter unit in time. When receiving a start success message sent by the grid-connected inverter unit, the monitoring unit controls the startup unit to stop working, to reduce power consumption.

The foregoing embodiment describes the working principle of obtaining power by the startup apparatus from the alternating current power grid. The following describes the working principle of obtaining power by the startup apparatus from the alternating current auxiliary power supply.

The following first describes the working principle of the alternating current auxiliary power supply.

Figure 7:
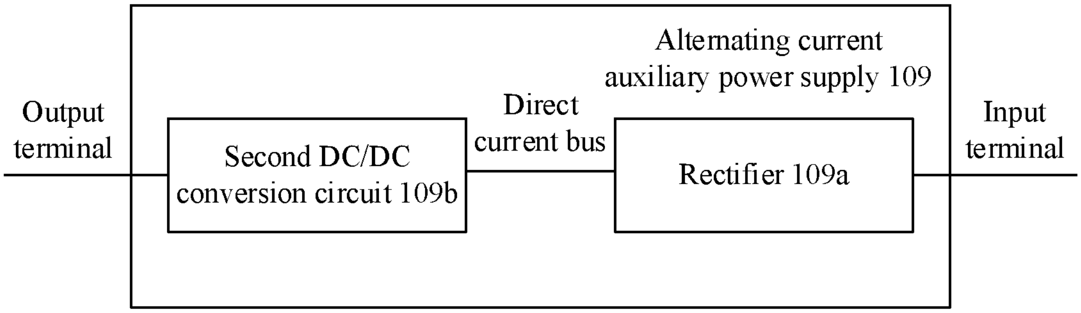
FIG. 7 is a schematic diagram of an alternating current auxiliary power supply according to an embodiment of this application.

FIG. 7 is a schematic diagram of an alternating current auxiliary power supply according to an embodiment of this application.

The alternating current auxiliary power supply 109 includes a rectifier 109*a* and a second DC-DC conversion circuit 109*b*.

An input terminal of the rectifier 109*a* is an input terminal of the alternating current auxiliary power supply 109, and is connected to an alternating current power grid. An output terminal of the rectifier 109*a* is connected to an input terminal of the second DC-DC conversion circuit 109*b*, and an output terminal of the second DC-DC conversion circuit 109*b* is connected to a monitoring unit, and is configured to supply power to the monitoring unit.

The rectifier 109*a* converts an alternating current obtained from the alternating current power grid into a direct current, and then inputs the direct current to the second DC-DC conversion circuit 109*b*. Generally, a voltage of the alternating current power grid is relatively high, and may reach hundreds of kilovolts. The second DC-DC conversion circuit 109*b* performs voltage conversion on the direct current, and generally converts a relatively high input voltage into a relatively low input voltage (for example, a direct current of 12 V, 24 V, or 48 V), and then supplies power to the monitoring unit 108*b* and an external fan of a grid-connected photovoltaic power generation system.

A direct current bus of the alternating current auxiliary power supply 109 is a bus connected to the input terminal of the second DC-DC conversion circuit 109*b*.

When obtaining power from the alternating current auxiliary power supply 109, a startup apparatus may obtain power from the direct current bus of the alternating current auxiliary power supply, or may obtain power from an output terminal of the alternating current auxiliary power supply 109. The following first describes a working principle of obtaining power by the startup apparatus from the direct current bus of the alternating current auxiliary power supply 109.

Apparatus Embodiment 5

A startup apparatus obtains power from a direct current bus of an alternating current auxiliary power supply.

Figure 8:
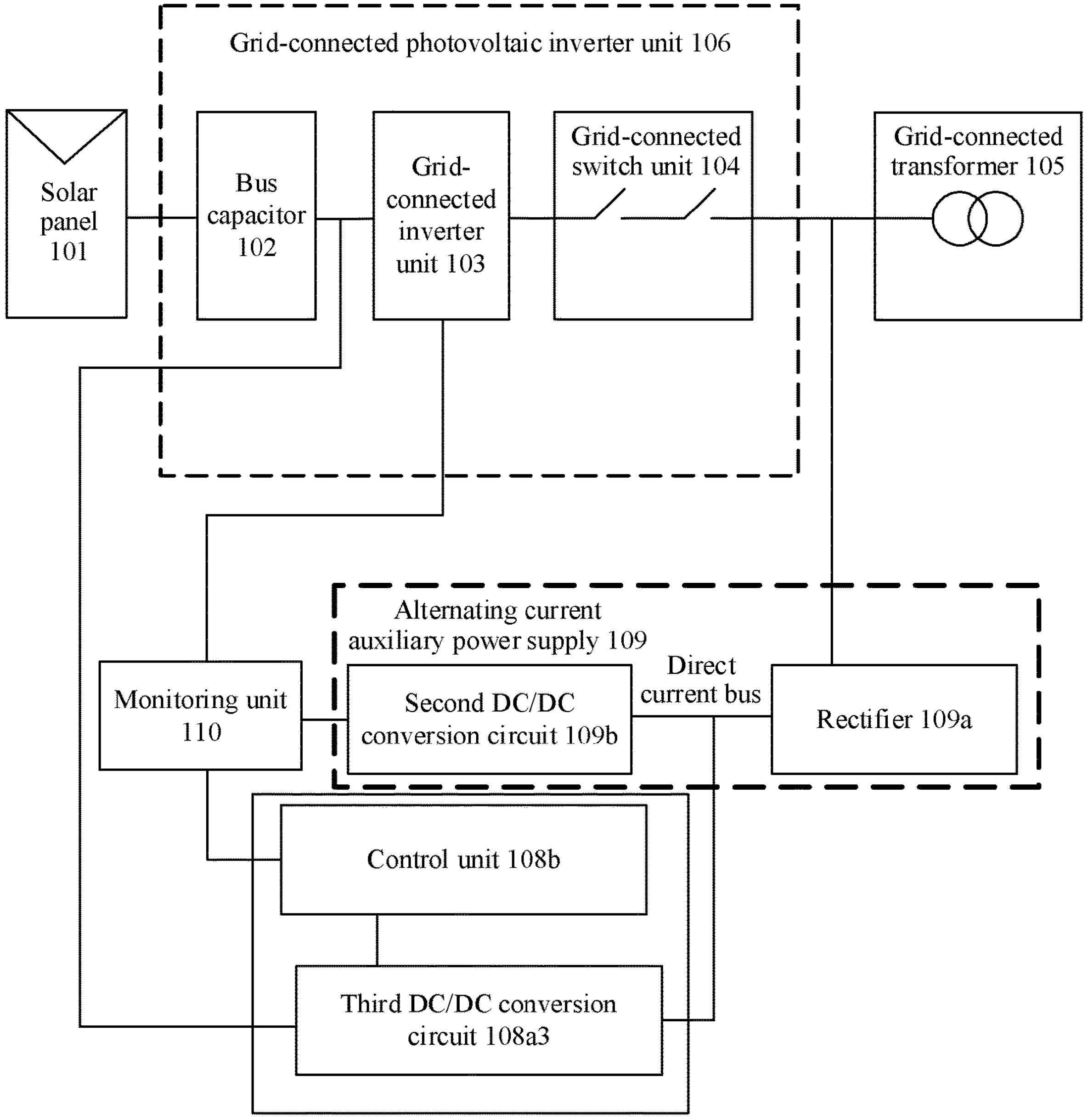
FIG. 8 is a schematic diagram of obtaining power by a startup apparatus from a direct current bus of an alternating current auxiliary power supply according to an embodiment of this application.

FIG. 8 is a schematic diagram of obtaining power by a startup apparatus from a direct current bus of an alternating current auxiliary power supply according to an embodiment of this application.

Because a direct current is directly on the direct current bus of the alternating current auxiliary power supply, a startup unit of the startup apparatus does not need to include a rectifier circuit, but includes only a third DC-DC conversion circuit 108*a*3.

An input terminal of the third DC-DC conversion circuit 108*a*3 is connected to the direct current bus of the alternating current auxiliary power supply 109, and an output terminal of the third DC-DC conversion circuit 108*a*3 is connected to a bus capacitor 102 connected to an input terminal of a grid-connected inverter unit 103.

The third DC-DC conversion circuit 108*a*3 is configured to convert a voltage of the direct current bus of the alternating current auxiliary power supply 109, and then provide a converted voltage to the bus capacitor connected to the input terminal of the grid-connected inverter unit.

A difference between the startup apparatus provided in this embodiment and the startup apparatus corresponding to FIG. 5*a* is that the startup apparatus provided in this embodiment does not include the rectifier circuit. This is because the startup apparatus provided in this embodiment directly obtains power from the direct current bus of the alternating current auxiliary power supply 109, the input terminal of the third DC-DC conversion circuit 108*a*3 obtains the direct current, and the startup apparatus only needs to perform direct current conversion. Therefore, a structure of the startup apparatus is simplified.

The third DC-DC conversion circuit 108*a*3 may be a single-ended flyback circuit, a forward isolation power supply, or another circuit that can implement direct current-direct current conversion. This is not specifically limited in this embodiment of this application.

The third DC-DC conversion circuit 108*a*3 can convert a direct current obtained from the direct current bus into a direct current that meets a grid voltage requirement. Specifically, a direct current voltage output from the third DC-DC conversion circuit 108*a*3 needs to be greater than a grid voltage of a grid-connected photovoltaic power generation system, so that an output voltage of a grid-connected photovoltaic inverter unit 106 can be input into an alternating current power grid.

The following describes a working principle of the startup unit with reference to a specific implementation of the third DC-DC conversion circuit 108*a*3.

Figure 9:
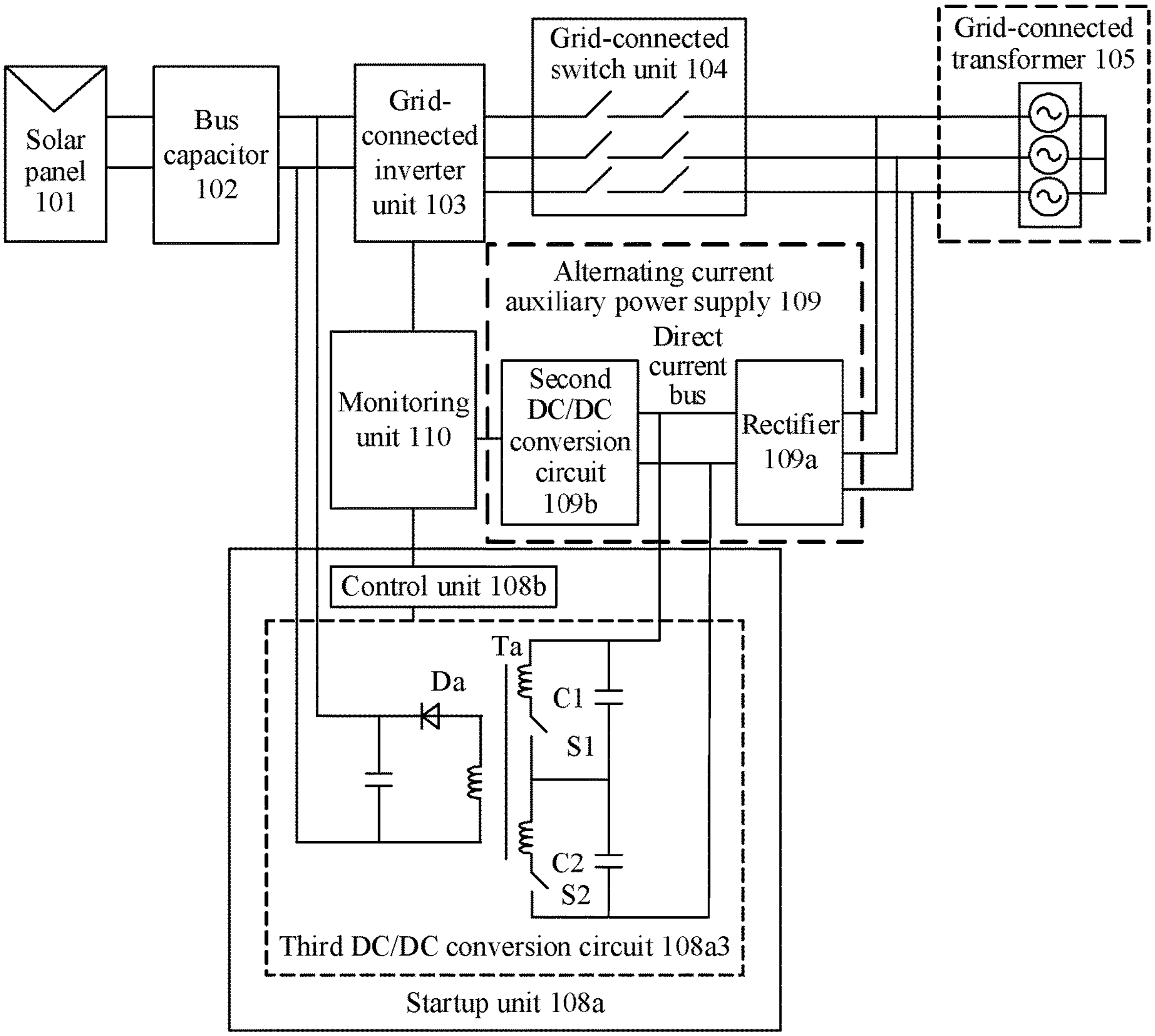
FIG. 9 is a schematic diagram of another startup unit according to an embodiment of this application.

FIG. 9 is a schematic diagram of another startup unit according to Embodiment 4 of this application.

A third DC-DC conversion circuit 108_a_3 may be a single-ended flyback circuit.

A monitoring unit 110 receives a start power obtaining instruction sent by a power station, and sends the start power obtaining instruction to a control unit 108_b_.

When the control unit 108_b_ receives the start power obtaining instruction sent by the monitoring unit 110, the third DC-DC conversion circuit 108_a_3 starts to work, obtains a direct current from a direct current bus of an alternating current auxiliary power supply 109, and outputs a direct current that meets a grid voltage requirement to a bus capacitor 102 connected to an input terminal of a grid-connected inverter unit 103, to start and grid-connect a grid-connected photovoltaic inverter unit 106.

When determining that a grid-connected switch of a grid-connected switch unit 104 is turned on and an rectifier circuit of the grid-connected inverter unit 103 does not generate an alarm, a controller of the grid-connected inverter unit 103 determines that the grid-connected photovoltaic inverter unit 106 is started and grid-connected successfully. In this case, the controller of the grid-connected inverter unit 103 sends a start success message to the monitoring unit 110.

When receiving the start success message sent by the grid-connected inverter unit 103, the monitoring unit 110 sends an instruction for stopping working to the control unit 108_b_. When receiving the instruction for stopping working, the control unit 108_b_ controls the third DC-DC conversion circuit 108_a_3 to stop performing direct current conversion, to reduce power consumption.

When receiving the start instruction sent by the power station, the startup apparatus provided in this embodiment of this application can obtain power from the direct current bus of the alternating current auxiliary power supply, and converts the obtained direct current into the direct current that meets the grid connection requirement, and then feeds the direct current to the bus capacitor connected to the input terminal of the grid-connected inverter unit in the grid-connected photovoltaic power generation system, to start the grid-connected inverter unit. The startup apparatus does not require an rectifier circuit that converts an alternating current into a direct current. Therefore, the structure of the startup apparatus is simple, and costs are reduced.

The foregoing embodiment describes a working mode in which the startup apparatus obtains power from the direct current bus of the alternating current auxiliary power supply, and the following describes a working mode in which the startup apparatus obtains power from a direct current output terminal of the alternating current auxiliary power supply.

Apparatus Embodiment 6

A startup apparatus obtains power from a direct current output terminal of an alternating current auxiliary power supply.

Figure 10:
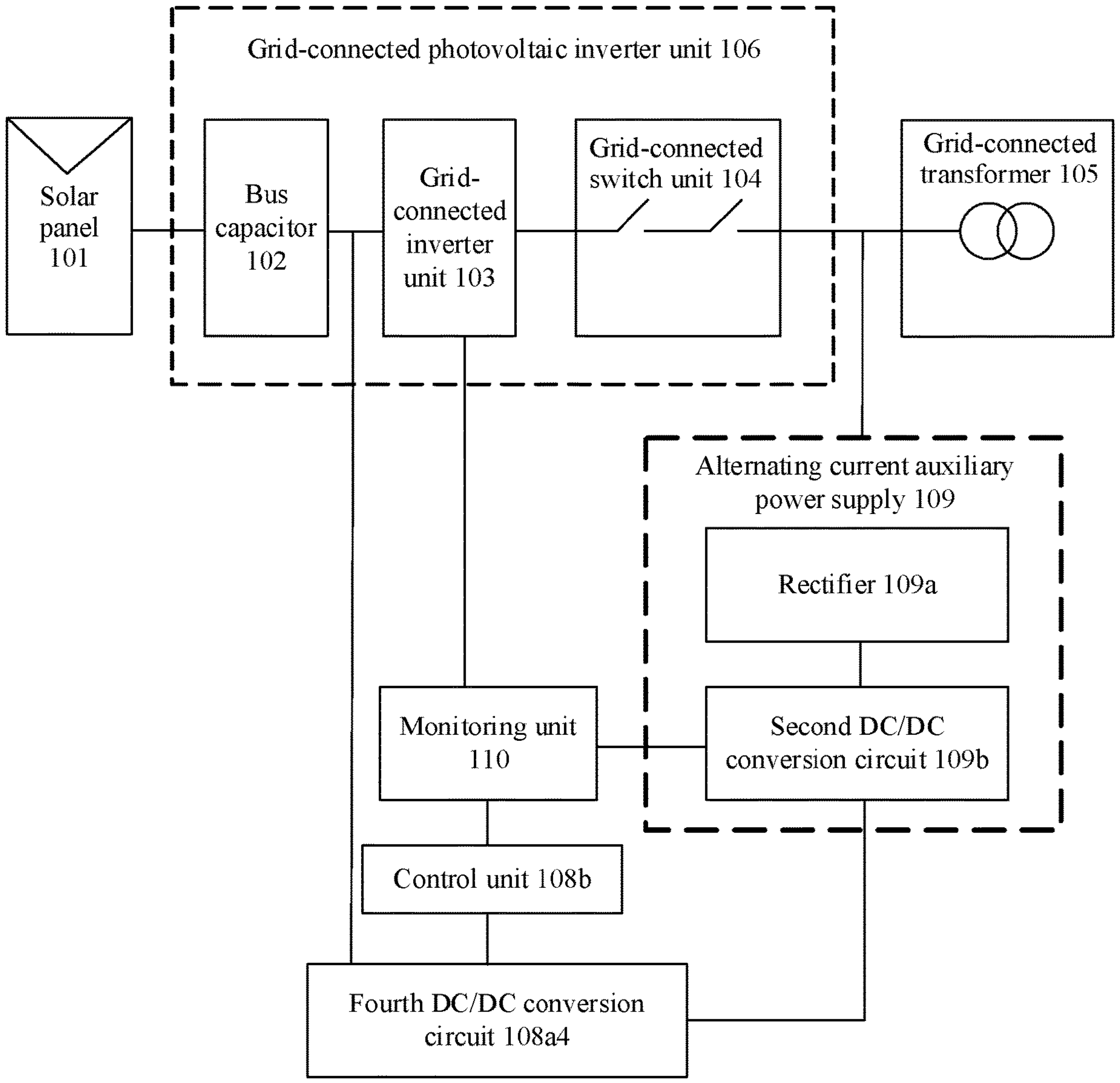
FIG. 10 is a schematic diagram of obtaining power by a startup apparatus from a direct current output terminal of an alternating current auxiliary power supply according to an embodiment of this application.

FIG. 10 is a schematic diagram of obtaining power by a startup apparatus from a direct current output terminal of an alternating current auxiliary power supply according to an embodiment of this application.

Because the direct current output terminal of the alternating current auxiliary power supply outputs a direct current, a startup unit of the startup apparatus does not need to include a rectifier circuit, but includes only a fourth DC-DC conversion circuit 108_a_4.

An input terminal of the fourth DC-DC conversion circuit 108_a_4 is connected to an output terminal of the alternating current auxiliary power supply 109, and an output terminal of the fourth DC-DC conversion circuit 108_a_4 is connected to a bus capacitor 102 connected to an input terminal of a grid-connected inverter unit 103.

The fourth DC-DC conversion circuit 108_a_4 is configured to convert a direct current obtained from the output terminal of the alternating current auxiliary power supply 109, and then provide a converted direct current to the bus capacitor 102 connected to the input terminal of the grid-connected inverter unit 103. Because the alternating current auxiliary power supply 109 includes a rectifier 109_a_ and a second DC-DC conversion circuit 109_b_, the input terminal of the fourth DC-DC conversion circuit 108_a_4 is connected to an output terminal of the second DC-DC conversion circuit 109_b_. In addition, because the input terminal of the fourth DC-DC conversion circuit 108_a_4 obtains the direct current, the startup apparatus only needs to perform direct current conversion, and does not require an rectifier circuit that converts an alternating current into a direct current. In this way, a structure of the startup apparatus is simplified.

The fourth DC-DC conversion circuit 108_a_4 may be a single-ended flyback circuit, a forward isolation circuit, or another circuit that can implement direct current-direct current conversion. This is not specifically limited in this embodiment of this application.

The fourth DC-DC conversion circuit 108_a_4 can convert the direct current obtained from the output terminal of the alternating current auxiliary power supply 109 into a direct current that meets a grid voltage requirement. Specifically, a direct current voltage output from the fourth DC-DC conversion circuit 108_a_4 needs to be greater than a grid voltage of a grid-connected photovoltaic power generation system, so that an output voltage of a grid-connected photovoltaic inverter unit 106 can be input into an alternating current power grid.

The following describes a working principle of the startup unit with reference to a specific implementation of the fourth DC-DC conversion circuit 108_a_4.

Figure 11:
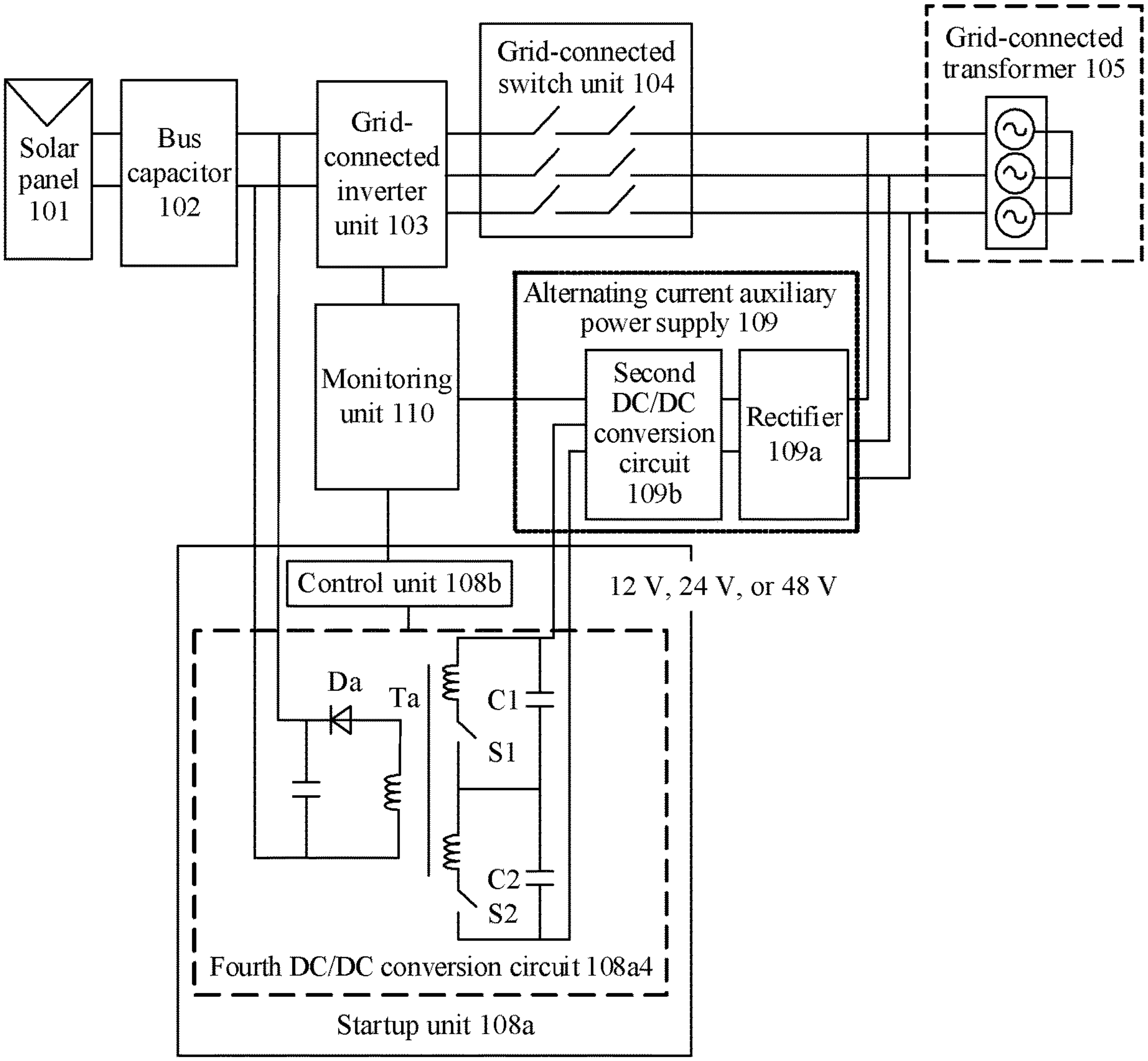
FIG. 11 is a schematic diagram of still another startup unit according to an embodiment of this application.

FIG. 11 is a schematic diagram of still another startup unit according to an embodiment of this application.

A fourth DC-DC conversion circuit 108_a_4 may be a single-ended flyback circuit.

A monitoring unit 110 receives a start power obtaining instruction sent by a power station, and sends the start power obtaining instruction to a control unit 108_b_.

When determining that the start power obtaining instruction is received, the control unit 108_b_ controls the fourth DC-DC conversion circuit 108_a_4 to start to work, obtains a direct current from an output terminal of an alternating current auxiliary power supply 109, and outputs a direct current that meets a grid voltage requirement to a bus capacitor 102 connected to an input terminal of a grid-connected inverter unit 103, to start and grid-connect a grid-connected photovoltaic inverter unit 106.

When determining that a grid-connected switch of a grid-connected switch unit 104 is turned on and an rectifier circuit of the grid-connected inverter unit 103 does not generate an alarm, a controller of the grid-connected inverter unit 103 determines that the grid-connected photovoltaic inverter unit 106 is started and grid-connected successfully. In this case, the controller of the grid-connected inverter unit 103 sends a start success message to the monitoring unit 110.

When receiving the start success message sent by the grid-connected inverter unit 103, the monitoring unit 110 sends an instruction for stopping working to the control unit 108_b_, and the control unit 108_b_ controls the fourth DC-DC conversion circuit 108_a_4 to stop performing direct current conversion, to reduce power consumption.

For a grid-connected photovoltaic power generation system in which a direct current voltage input by a solar panel 101 is 1000 V, when a valid value U1 of a grid voltage is equal to 500 V and a voltage fluctuation ratio k is equal to 1.2, it may be determined according to the formula (1) that an output voltage of the fourth DC-DC conversion circuit 108*a*2 may be selected as 850 V. A voltage of the direct current obtained by the fourth DC-DC conversion circuit 108*a*4 from the output terminal of the alternating current auxiliary power supply 109 is usually relatively low, and may be 12 V, 24 V, 48 V, or the like. The fourth DC-DC conversion circuit 108*a*4 can boost a relatively low voltage to a voltage that meets the grid voltage requirement, and then output the voltage.

When receiving the start instruction sent by the power station, the startup apparatus included in the startup apparatus provided in this embodiment of this application can obtain the direct current from the output terminal of the alternating current auxiliary power supply, and converts the obtained direct current into the direct current that meets the grid connection requirement, and then feeds the direct current to the bus capacitor connected to the input terminal of the grid-connected inverter unit in a grid-connected photovoltaic power generation system, to start the grid-connected inverter unit. The startup apparatus does not require the rectifier circuit that converts an alternating current into a direct current. Therefore, a structure is simple and costs are reduced.

Starting Method Embodiment

Based on the startup apparatus of the grid-connected photovoltaic power generation system provided in the foregoing embodiments, this embodiment of this application further provides a starting method of a grid-connected photovoltaic power generation system. The following provides specific descriptions with reference to the accompanying drawing.

Figure 12:
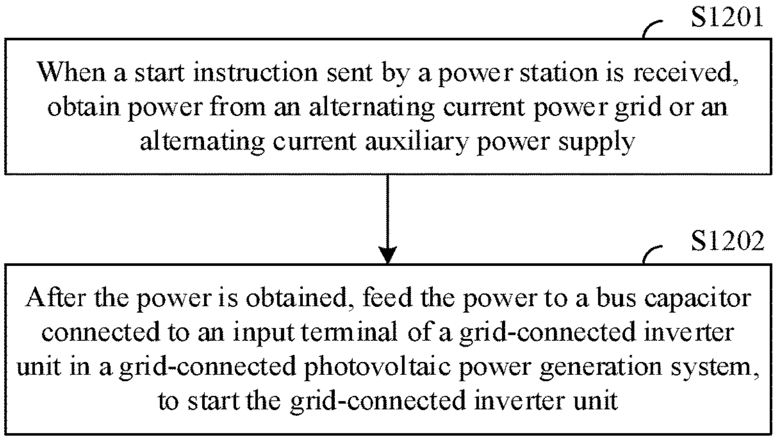
FIG. 12 is a flowchart of a starting method of a grid-connected photovoltaic power generation system according to an embodiment of this application.

FIG. 12 is a flowchart of a starting method of a grid-connected photovoltaic power generation system according to an embodiment of this application.

The method is applied to a grid-connected photovoltaic power generation system. For the working principle of the photovoltaic power generation system, refer to the descriptions corresponding to FIG. 1. Details are not described in this embodiment of this application.

The method includes the following steps.

S1201: When a start instruction is received, obtain power from an alternating current power grid or obtain power from an alternating current auxiliary power supply.

S1202: After the power is obtained, feed the power to a bus capacitor connected to an input terminal of a grid-connected inverter unit in the grid-connected photovoltaic power generation system, to start the grid-connected inverter unit.

When power is obtained from the alternating current power grid, an alternating current is obtained. Therefore, the obtained alternating current needs to be converted into a direct current of a preset amplitude, and then feeds the direct current of the preset amplitude to the bus capacitor connected to the input terminal of the grid-connected inverter unit.

When power is obtained from the alternating current auxiliary power supply, the power may be obtained from a direct current bus of the alternating current auxiliary power supply, or the power may be obtained from a direct current output terminal of the alternating current auxiliary power supply. The obtained power is a direct current. The direct current obtained from the alternating current auxiliary power supply is converted into the direct current of the preset amplitude, and then the direct current of the preset amplitude is fed to the bus capacitor connected to the input terminal of the grid-connected inverter unit.

It should be noted that a direct current voltage input to the bus capacitor needs to be greater than a grid voltage of the grid-connected photovoltaic power generation system, so that an output voltage of a grid-connected photovoltaic inverter unit can be input to the alternating current power grid.

According to the starting method of the grid-connected photovoltaic power generation system provided in this embodiment of this application, power obtained from the alternating current power grid or power obtained from the alternating current auxiliary power supply is fed to the bus capacitor connected to the input terminal of the grid-connected inverter unit in the grid-connected photovoltaic power generation system, to start the grid-connected inverter unit. The alternating current power grid is energized and the alternating current auxiliary power supply obtains power from the alternating current power grid. Therefore, the alternating current auxiliary power supply is also energized. Therefore, a power obtaining time of a startup apparatus is not limited, to be specific, when there is no sunlight, the startup apparatus can still obtain power based on a scheduling requirement to start the grid-connected inverter unit, without connecting the grid-connected photovoltaic power generation system to the power grid in advance and ensuring that the system is not disconnected from the power grid. Even if the grid-connected photovoltaic power generation system is suspended due to a fault, after the fault is rectified, the startup apparatus can still obtain power to normally restart the grid-connected photovoltaic power generation system. In this way, scheduling of the grid-connected photovoltaic power generation system can be normally performed.

Further, an rectifier circuit of the grid-connected inverter unit converts the received direct current into an alternating current for output, and a controller of the grid-connected inverter unit controls working of the rectifier circuit of the grid-connected inverter unit and can further control a working state of a grid-connected switch in a grid-connected switch unit.

When the controller of the grid-connected inverter unit controls the grid-connected switch included in the grid-connected switch unit to be turned on, the grid-connected inverter unit is connected to a grid-connected transformer by using the grid-connected switch unit. In this case, the grid-connected inverter unit may directly obtain power from the alternating current power grid to maintain a working state of the grid-connected inverter unit, that is, the grid-connected photovoltaic inverter unit is started.

After the grid-connected photovoltaic inverter unit is started, the starting method further includes:

when a start success message sent by the grid-connected inverter unit is received, controlling a startup unit to stop working, to reduce power consumption.

Grid-Connected Photovoltaic Power Generation System Embodiment

Based on the startup apparatus and the starting method of the grid-connected photovoltaic power generation system provided in the foregoing embodiments, this embodiment of this application further provides a grid-connected photovoltaic power generation system. The following provides specific descriptions with reference to the accompanying drawings.

Figure 13:
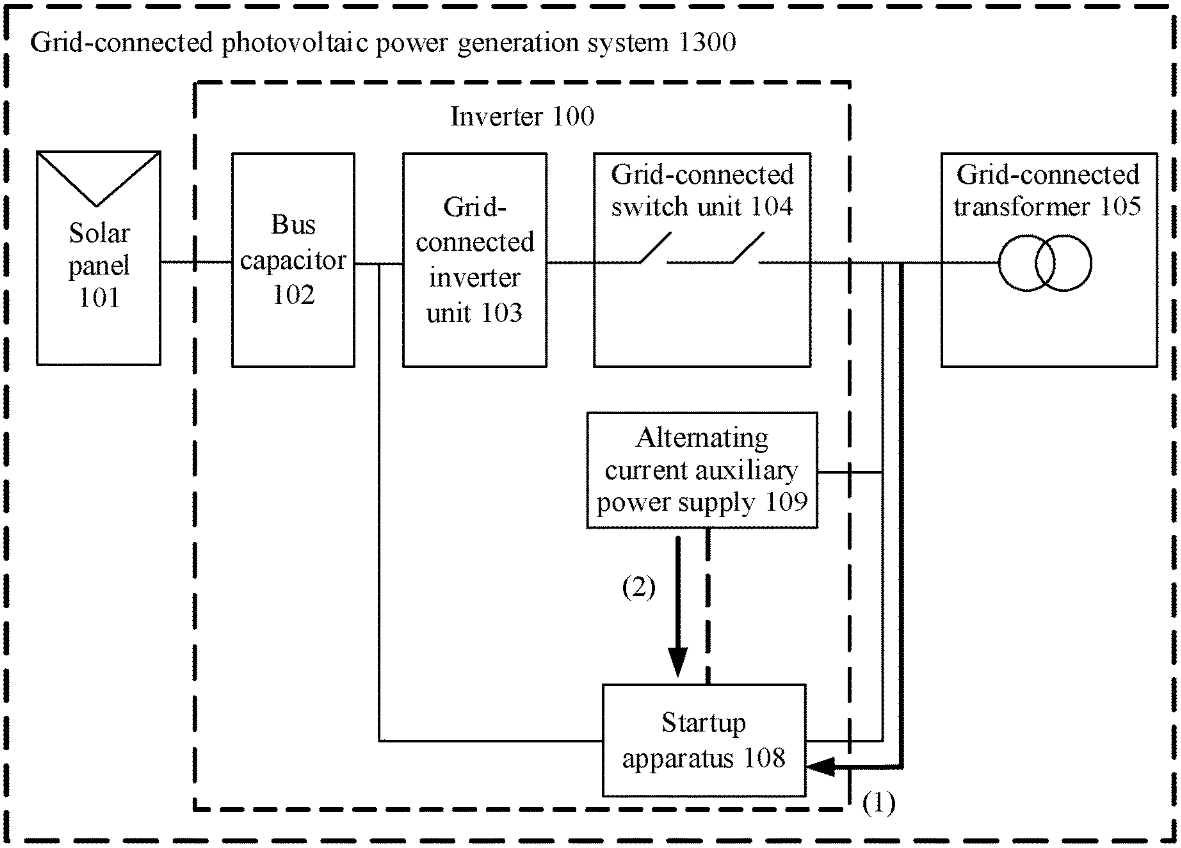
FIG. 13 is a schematic diagram of a grid-connected photovoltaic power generation system according to an embodiment of this application.

FIG. 13 is a schematic diagram of a grid-connected photovoltaic power generation system according to an embodiment of this application.

The grid-connected photovoltaic power generation system 1300 includes a solar panel 101, an inverter 100, and a grid-connected transformer 105.

The inverter 100 includes a bus capacitor 102, a grid-connected inverter unit 103, a grid-connected switch unit 104, an alternating current auxiliary power supply 109, and a startup apparatus 108.

In the grid-connected photovoltaic power generation system 1300 provided in this embodiment, an example in which the inverter 100 includes the bus capacitor 102 and the startup apparatus 108 is used. It may be understood that the bus capacitor 102 may not be included in the inverter 100. Alternatively, the startup apparatus 108 may not be included in the inverter 100 and exist as an independent device. However, for the two cases, working principles of the startup apparatus 108 are the same. Details are not described in this embodiment of this application.

An input terminal of the grid-connected inverter unit 103 is connected to the solar panel 101, and an output terminal of the grid-connected inverter unit 103 is connected to an alternating current power grid. Specifically, the output terminal of the grid-connected inverter unit 103 may be connected to the alternating current power grid by using the grid-connected transformer 105. The bus capacitor is connected to the input terminal of the grid-connected inverter unit 103.

The startup apparatus 108 is configured to start the grid-connected inverter unit 103 when energy of the solar panel 101 cannot start the grid-connected inverter unit 103.

Figure 14:
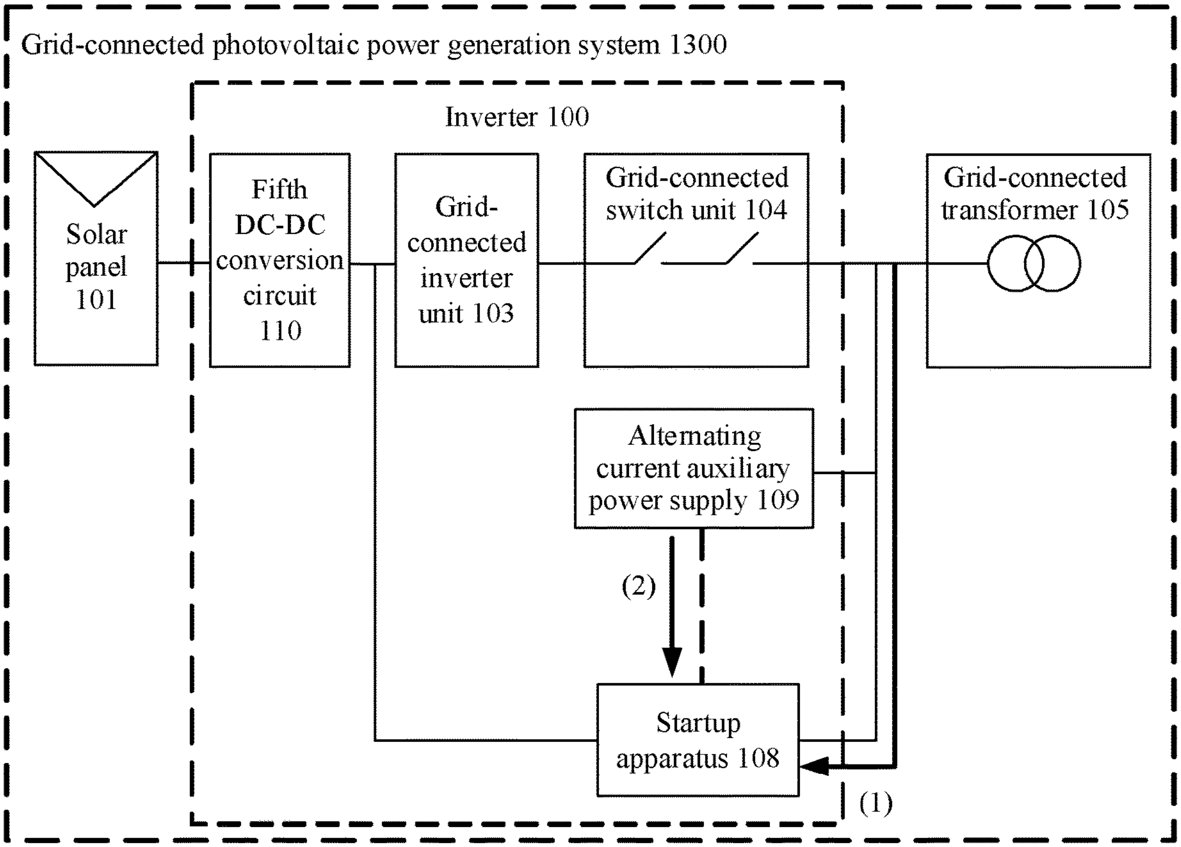
FIG. 14 is a schematic diagram of another grid-connected photovoltaic power generation system according to an embodiment of this application.

The startup apparatus 108 may obtain power from the alternating current power grid or obtain power from the alternating current auxiliary power supply. The alternating current power grid is energized and the alternating current auxiliary power supply obtains power from the alternating current power grid. Therefore, the alternating current auxiliary power supply is also energized. Therefore, a power obtaining time of the startup apparatus is not limited, to be specific, when there is no sunlight, the startup apparatus can still obtain power based on a scheduling requirement to start the grid-connected inverter unit, without connecting the grid-connected photovoltaic power generation system to the power grid in advance and keeping the grid-connected photovoltaic power generation system connected to the power grid. Even if the grid-connected photovoltaic power generation system is suspended due to a fault, after the fault is rectified, the startup apparatus can still obtain power to normally restart the grid-connected photovoltaic power generation system. In this way, scheduling of the grid-connected photovoltaic power generation system can be normally performed. FIG. 14 is a schematic diagram of another grid-connected photovoltaic power generation system according to an embodiment of this application.

A difference between the grid-connected photovoltaic power generation system shown in FIG. 14 and the grid-connected photovoltaic power generation system shown in FIG. 13 lies in that the grid-connected photovoltaic power generation system further includes a boost circuit, that is, the grid-connected photovoltaic power generation system shown in FIG. 14 includes a fifth DC-DC conversion circuit 110.

An input terminal of the fifth DC-DC conversion circuit 110 is connected to the solar panel 101, to be specific, connected to a photovoltaic unit of the grid-connected photovoltaic power generation system, and an output terminal of the fifth DC-DC conversion circuit 110 is connected to the input terminal of the grid-connected inverter unit 103. The bus capacitor is an output capacitor of the fifth DC-DC conversion circuit 110. The fifth DC-DC conversion circuit 110 is the boost circuit, and is configured to boost a voltage input to the grid-connected inverter unit 103, to be specific, boost a voltage output from the solar panel 101.

For specific descriptions and working principles of the grid-connected photovoltaic power generation systems shown in FIG. 13 and FIG. 14, refer to the foregoing embodiments. Details are not described in this embodiment.

The grid-connected photovoltaic power generation system provided in this embodiment of this application includes the startup apparatus. The startup apparatus can obtain power from the alternating current power grid, as shown by an arrow (1) in the figure; or obtain power from the alternating current auxiliary power supply, as shown by arrow (2) in the figure. After obtaining the power, the startup apparatus feeds the power to the bus capacitor connected to the input terminal of the grid-connected inverter unit in the grid-connected photovoltaic power generation system, to start the grid-connected inverter unit.

When the startup apparatus 108 includes a monitoring unit, the alternating current auxiliary power supply 109 supplies power to the monitoring unit. The monitoring unit can receive a start instruction sent by a power station and send a control instruction to a startup unit, so that the startup unit starts the grid-connected photovoltaic power generation system in time. The monitoring unit can further send an instruction for stopping working to the startup unit when receiving a start success message sent by the grid-connected inverter unit, so that the startup unit stops working.

When obtaining power from the alternating current power grid, the startup apparatus obtains an alternating current, and the startup apparatus can further convert the obtained alternating current into a direct current of a preset amplitude, and then feed the direct current of the preset amplitude to the bus capacitor connected to the input terminal of the grid-connected inverter unit.

When obtaining power from the alternating current auxiliary power supply, the startup apparatus may obtain the power from a direct current bus of the alternating current auxiliary power supply or obtain the power from a direct current output terminal of the alternating current auxiliary power supply. All the power obtained by the startup apparatus is a direct current. The startup apparatus can further convert the direct current obtained from the alternating current auxiliary power supply into the direct current of the preset amplitude, and then feed the direct current of the preset amplitude to the bus capacitor connected to the input terminal of the grid-connected inverter unit.

The alternating current power grid is energized and the alternating current auxiliary power supply obtains power from the alternating current power grid. Therefore, the alternating current auxiliary power supply is also energized. Therefore, a power obtaining time of the startup apparatus is not limited, to be specific, when there is no sunlight, the startup apparatus can still obtain power based on a scheduling requirement to start the grid-connected inverter unit, without connecting the grid-connected photovoltaic power generation system to the power grid in advance and keeping the grid-connected photovoltaic power generation system connected to the power grid. Even if the grid-connected photovoltaic power generation system is suspended due to a fault, after the fault is rectified, the startup apparatus can still obtain power to normally restart the grid-connected photovoltaic power generation system. In this way, scheduling of the grid-connected photovoltaic power generation system can be normally performed.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An inverter system of a grid-connected photovoltaic power generation system, comprising:

- a grid-connected photovoltaic inverter unit having an output end connected to an alternating current power grid, the photovoltaic inverter unit including a bus capacitor connected to an input terminal of a grid-connected inverter unit;
- an alternating current auxiliary power supply connected to the output end of the photovoltaic inverter unit and configured to receive alternating current from the alternating current power grid and to convert the alternating current into a first direct current; and
- a startup apparatus including a control unit configured to receive a start instruction when there is an insufficient sunlight condition, the startup apparatus being electrically connected to the alternating current auxiliary power supply and configured to receive the first direct current from the alternating current auxiliary power supply; and
- the startup apparatus is further configured to provide the first direct current to the bus capacitor to start the grid-connected inverter unit.

2. The inverter system according to claim 1, wherein the startup apparatus further comprises a startup unit, wherein

- the control unit is further configured to: when the start instruction is received, send a start power obtaining instruction to the startup unit; and
- the startup unit is configured to obtain the first direct current from the alternating current auxiliary power supply according to the start power obtaining instruction, and provide the first direct current to the bus capacitor.

3. The inverter system according to claim 2, wherein the control unit is configured to receive the start instruction from a monitoring unit, the monitoring unit is configured to communicate between the inverter unit and a power station; the alternating current auxiliary power supply comprises a rectifier and a second direct current-direct current conversion circuit; an input terminal of the rectifier is connected to the alternating current power grid, and an output terminal of the rectifier is connected to the second direct current-direct current conversion circuit; a direct current bus of the alternating current auxiliary power supply is connected to an input terminal of the second direct current-direct current conversion circuit; and an output terminal of the second direct current-direct current conversion circuit is connected to the monitoring unit and is configured to supply power to the monitoring unit; and that

- the startup unit is configured to obtain the first direct current from the alternating current auxiliary power supply comprises: obtaining, by the startup unit, the first direct current from the direct current bus of the alternating current auxiliary power supply.

4. The inverter system according to claim 3, wherein the startup unit comprises a third direct current-direct current conversion circuit, wherein

- the third direct current-direct current conversion circuit is configured to convert a voltage of the direct current bus of the alternating current auxiliary power supply, and provide a converted voltage to the bus capacitor.

5. The inverter system according to claim 2, wherein the control unit is configured to receive the start instruction from a monitoring unit, the monitoring unit is configured to communicate between the inverter unit and a power station; the alternating current auxiliary power supply comprises a rectifier and a second direct current-direct current conversion circuit; an input terminal of the rectifier is connected to the alternating current power grid, and an output terminal of the rectifier is connected to the second direct current-direct current conversion circuit; a direct current bus of the alternating current auxiliary power supply is connected to an input terminal of the second direct current-direct current conversion circuit; and an output terminal of the second direct current-direct current conversion circuit is connected to the monitoring unit and is configured to supply power to the monitoring unit; and

- that the startup unit is configured to obtain direct current from the alternating current auxiliary power supply comprises: obtaining, by the startup unit, the direct current from the output terminal of the second direct current-direct current conversion circuit.

6. The inverter system according to claim 5, wherein the startup unit is configured to obtain the power from the alternating current auxiliary power supply, and the startup unit comprises a fourth direct current-direct current conversion circuit, wherein

- the fourth direct current-direct current conversion circuit is configured to convert an output voltage of the alternating current auxiliary power supply, and provide a converted output voltage to the bus capacitor.

7. The inverter system according to claim 1, wherein the grid-connected photovoltaic power generation system comprises a fifth direct current-direct current conversion circuit, an input terminal of the fifth direct current-direct current conversion circuit is connected to a photovoltaic unit, and an output terminal of the fifth direct current-direct current conversion circuit is connected to the input terminal of the grid-connected inverter unit; and the bus capacitor is an output capacitor of the fifth direct current-direct current conversion circuit.

8. The inverter system according to claim 3, wherein the monitoring unit is further configured to: when a start success message sent by the grid-connected inverter unit is received, send an instruction to the startup unit so that the startup unit stops working.

9. An inverter system comprising:

- a grid-connected photovoltaic inverter unit having an output end connected to an alternating current power grid, the photovoltaic inverter unit including a bus capacitor connected to an input terminal of a grid-connected inverter unit;
- an alternating current auxiliary power supply connected to the output end of the photovoltaic inverter unit and configured to receive alternating current from the alternating current power grid and to convert the alternating current into a first direct current;

a startup apparatus including a startup unit and a control unit configured to receive a start instruction when there is an insufficient sunlight condition, wherein the startup unit is electrically connected to the alternating current auxiliary power supply and is configured to receive the first direct current from the alternating current auxiliary power supply;

the control unit is configured to send a start power obtaining instruction to the startup unit when the start instruction is received; and the startup unit is configured to, according to the start power obtaining instruction, provide to the bus capacitor the first direct current from the alternating current auxiliary power supply to start the grid-connected inverter unit.

10. The inverter system according to claim 9, wherein the startup unit is configured to obtain power from the alternating current auxiliary power supply, the startup unit comprises a fourth direct current-direct current conversion circuit, wherein the fourth direct current-direct current conversion circuit is configured to convert an output voltage of the alternating current auxiliary power supply, and provide a converted output voltage to the bus capacitor connected to the input terminal of the grid-connected inverter unit.

* * * * *